(12) United States Patent
Guan et al.

(10) Patent No.: US 11,463,953 B2
(45) Date of Patent: Oct. 4, 2022

(54) METHOD FOR MANAGING ANTENNA PANEL, NETWORK DEVICE, AND TERMINAL DEVICE

(71) Applicant: Huawei Technologies Co., Ltd., Shenzhen (CN)

(72) Inventors: Peng Guan, Shenzhen (CN); Lei Chen, Chengdu (CN); Xi Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/172,938

(22) Filed: Feb. 10, 2021

(65) Prior Publication Data
US 2021/0168714 A1 Jun. 3, 2021

Related U.S. Application Data

(63) Continuation of application No. PCT/CN2019/099646, filed on Aug. 7, 2019.

(30) Foreign Application Priority Data

Aug. 10, 2018 (CN) .......................... 201810929690.7

(51) Int. Cl.
*H04W 52/02* (2009.01)
*H04W 72/04* (2009.01)
*H04L 5/00* (2006.01)

(52) U.S. Cl.
CPC ....... *H04W 52/0216* (2013.01); *H04L 5/0051* (2013.01); *H04W 72/044* (2013.01); *H04W 72/048* (2013.01)

(58) Field of Classification Search
CPC ......... H04W 52/0216; H04W 52/0212; H04W 72/048; H04W 72/044; H04W 72/04;
(Continued)

(56) References Cited

U.S. PATENT DOCUMENTS

| 7,245,938 B2 | 7/2007 | Sobczak et al. |
| 9,893,435 B2 | 2/2018 | Bily et al. |

(Continued)

FOREIGN PATENT DOCUMENTS

| CA | 3049490 A1 * | 7/2018 | ........... H04B 17/373 |
| CA | 3107891 A1 * | 2/2020 | ........... H04B 7/0695 |

(Continued)

OTHER PUBLICATIONS

Huawei et al.,"Views on NR UE capabilities", 3GPP TSG RAN Meeting #80, RP-180873, La Jolla, USA, total 4 pages, 3rd Generation Partnership Project, Valbonne, France (Jun. 11-14, 2018).

(Continued)

*Primary Examiner* — Phong La
(74) *Attorney, Agent, or Firm* — Leydig, Voit & Mayer, Ltd.

(57) ABSTRACT

This application provides a method for managing an antenna panel, a network device, and a terminal device. The method includes: a network device receives capability information that is of an antenna panel and that is from a terminal device, and sends an activation command and/or a deactivation command to the terminal device, so that the terminal device performs a corresponding operation. In embodiments of this application, the network device assists the terminal device in managing an antenna panel, so that the terminal device can better manage the antenna panel, thereby reducing overheads of the terminal device.

20 Claims, 4 Drawing Sheets

(58) Field of Classification Search
CPC ..... H04W 72/10; H04W 72/06; H04W 72/08; H04L 5/0051; H04L 5/0048
See application file for complete search history.

(56) References Cited

U.S. PATENT DOCUMENTS

| | | | |
|---|---|---|---|
| 11,258,499 B2* | 2/2022 | Park | H04L 5/10 |
| 2017/0331529 A1* | 11/2017 | Lee | H04B 7/0452 |
| 2018/0227094 A1* | 8/2018 | Liu | H04W 72/046 |
| 2019/0159156 A1* | 5/2019 | Abedini | H04L 5/0048 |
| 2021/0119688 A1* | 4/2021 | Enescu | H04L 5/0048 |
| 2021/0168714 A1* | 6/2021 | Guan | H04B 7/0695 |
| 2022/0046735 A1* | 2/2022 | Wang | H04W 24/10 |

FOREIGN PATENT DOCUMENTS

| | | | | |
|---|---|---|---|---|
| CN | 103168391 A | | 6/2013 | |
| CN | 103620980 A | | 3/2014 | |
| CN | 104782056 A | | 7/2015 | |
| CN | 110868231 B | * | 8/2021 | ............ H04B 1/40 |
| RU | 2613526 C1 | | 3/2017 | |
| WO | 2017192889 A1 | | 11/2017 | |
| WO | 2018058608 A1 | | 4/2018 | |
| WO | 2018131945 A1 | | 7/2018 | |
| WO | 2018141204 A1 | | 8/2018 | |
| WO | WO-2018203308 A1 | * | 11/2018 | ............ H04B 7/063 |

OTHER PUBLICATIONS

"3rd Generation Partnership Project;Technical Specification Group Radio Access Network;NR;User Equipment (UE) radio transmission and reception;Part 1: Range 1 Standalone(Release 15)", 3GPP TS 38.101-1 V15.2.0, total 126 pages, 3rd Generation Partnership Project, Valbonne, France (Jun. 2018).

"3rd Generation Partnership Project;Technical Specification Group Radio Access Network;NR;User Equipment (UE) radio transmission and reception;Part 2: Range 2 Standalone(Release 15)", 3GPP TS 38.101-2 V15.2.0, total 68 pages, 3rd Generation Partnership Project, Valbonne, France (Jun. 2018).

"SRS antenna switching for 1T4R and 2T4R," 3GPP TSG RAN WG1 Meeting #92bis, R1-1805278, Sanya, China, XP051427507, Total 19 pages, 3rd Generation Partnership Project, Valbonne, France (Apr. 16-20, 2018).

"3rd Generation Partnership Project; Technical Specification Group Radio Access Network; NR; Requirements for support of radio resource management (Release 15)," 3GPP TS 38.133 V15.2.0, pp. 1-79, 3rd Generation Partnership Project, Valbonne, France (Jun. 2018).

* cited by examiner

METHOD FOR MANAGING ANTENNA PANEL, NETWORK DEVICE, AND TERMINAL DEVICE

CROSS-REFERENCE TO RELATED APPLICATIONS

This application is a continuation of International Application No. PCT/CN2019/099646, filed on Aug. 7, 2019, which claims priority to Chinese Patent Application No. 201810929690.7, filed on Aug. 10, 2018. The disclosures of the aforementioned applications are hereby incorporated by reference in their entireties.

TECHNICAL FIELD

Embodiments of this application relate to the communications field, and more specifically, to a method for managing an antenna panel, a network device, and a terminal device.

BACKGROUND

To implement ultra-high-speed short-distance communication and support 5G requirements on a capacity, a transmission rate, and the like, a mobile communications system transmits a signal by using a high frequency band (for example, 6 GHz or above), to relieve a current shortage of spectrum resources. Data is transmitted in a high-frequency cell by using a beam. For example, a terminal device and a network device may transmit data through beam alignment. The terminal device may include a plurality of antenna panels, which may cover a plurality of different directions. Currently, the terminal device manages the plurality of antenna panels to implement a communication requirement. However, because an amount of information obtained by the terminal device is insufficient, the terminal device has a limitation in managing the antenna panels. For example, the terminal device may turn on the plurality of antenna panels at an unnecessary time, and this causes a power waste. For another example, the terminal device may not activate the plurality of antenna panels when the antenna panels need to be turned on, and this causes a communication performance loss.

SUMMARY

In view of this, this application provides a method for managing an antenna panel, a network device, and a terminal device, so that the network device assists the terminal device in managing an antenna panel, thereby reducing overheads of the terminal device.

According to a first aspect, a method for managing an antenna panel is provided, and includes: A network device receives capability information that is of an antenna panel and that is from a terminal device. The network device sends first indication information to the terminal device. The first indication information is used to indicate the terminal device to activate and/or deactivate one or more antenna panels. In this way, the terminal device reports the capability information to the network device, to obtain an activation command and/or a deactivation command delivered by the network device, so that the terminal device can better manage an antenna panel.

Optionally, if the first indication information is used to indicate the terminal device to activate one or more first antenna panels, the first indication information carries information required for activating the one or more first antenna panels; and/or if the first indication information is used to indicate the terminal device to deactivate one or more second antenna panels, the first indication information includes information required for deactivating the one or more second antenna panels.

In other words, if the first indication information is used to indicate the terminal device to activate the one or more first antenna panels, the first indication information may be understood as an antenna panel activation command. Optionally, the first indication information may include one or more of the following: indication information used to distinguish whether the first indication information is for activating an antenna panel or deactivating an antenna panel, antenna panel identification information, antenna panel activation duration, an antenna panel activation time offset, antenna panel activation information, an antenna panel activation mode, antenna panel power control adjustment information, antenna panel timing advance (antenna panel TA) adjustment information, antenna panel activation priority information, and the like.

If the first indication information is used to indicate the terminal device to deactivate the one or more second antenna panels, the first indication information may be understood as an antenna panel deactivation command. Optionally, the first indication information may include one or more of the following: indication information used to distinguish whether the first indication information is for activating an antenna panel or deactivating an antenna panel, antenna panel identification information, antenna panel deactivation information, an antenna panel deactivation time offset, antenna panel deactivation duration, an antenna panel deactivation mode, antenna panel power control adjustment information, antenna panel timing advance (antenna panel TA) adjustment information, antenna panel deactivation priority information, and the like.

In a possible implementation, the method further includes: The network device sends first resource configuration information to the terminal device. The first resource configuration information is used to configure one or more reference signal resource sets, and each reference signal resource set is associated with one antenna panel.

Optionally, that each reference signal resource set is associated with one antenna panel may include any one of the following cases: An identifier of each reference signal resource set is associated with one antenna panel. An identifier of each reference signal resource set is associated with an identifier of one antenna panel. Each reference signal resource set is associated with an identifier of one antenna panel. This is not limited. In addition, the association relationship may be a one-to-one relationship or a one-to-many relationship. This is not limited.

In a possible implementation, if the first indication information is used to indicate the terminal device to activate the one or more first antenna panels, the method further includes: The network device sends first time information to the terminal device. The first time information is used to indicate that the terminal device is to keep the one or more first antenna panels in an active state after a first time ends. Therefore, the network device may indicate time sequence information to the terminal device, so that the terminal device keeps the antenna panels in the active state after a period of time.

Optionally, if the first indication information is used to indicate the terminal device to activate the one or more first antenna panels, the method further includes: The network device indicates, to the terminal device, duration for keeping the one or more first antenna panels activated. Therefore, the network device may indicate the activation duration to the terminal device, so that the terminal device keeps the antenna panels in the active state for a period of time.

In a possible implementation, if the first indication information is used to indicate the terminal device to deactivate the one or more second antenna panels, the method further includes:

The network device sends second time information to the terminal device. The second time information is used to indicate that the terminal device deactivates the one or more second antenna panels after a second time.

Optionally, if the first indication information is used to indicate the terminal device to deactivate the one or more second antenna panels, the method further includes: The network device indicates, to the terminal device, duration for keeping the one or more second antenna panels deactivated. Therefore, the network device may indicate the deactivation duration to the terminal device, so that the terminal device keeps the antenna panels in an inactive state for a period of time.

In a possible implementation, the method further includes:

The network device sends power control configuration of each of the one or more antenna panels to the terminal device. Optionally, the power control configuration includes one or more of the following parameters: an open-loop power parameter, a closed-loop power parameter, a path loss compensation parameter, a power accumulation form, and an MCS power adjustment amount. Therefore, the network device may deliver the power control configuration of the antenna panel to the terminal device.

In a possible implementation, the method further includes:

The network device sends timing advance information of an antenna panel to the terminal device. The timing advance information includes a timing advance, and the antenna panel is any one of the one or more antenna panels that need to be activated or deactivated and that are indicated by the network device.

Optionally, the timing advance information further includes timing advance adjustment information, and the timing advance adjustment information is used to indicate the terminal device to adjust the timing advance used for any antenna panel.

According to a second aspect, a method for managing an antenna panel is provided, and includes: A terminal device sends capability information to a network device. The terminal device receives first indication information that is from the network device. The first indication information is used to indicate the terminal device to activate and/or deactivate one or more antenna panels. The terminal device activates and/or deactivates the one or more antenna panels. In this way, the terminal device reports the capability information to the network device, to obtain an activation command and/or a deactivation command delivered by the network device, so that the terminal device can better manage the antenna panel.

Optionally, if the first indication information is used to indicate the terminal device to activate one or more first antenna panels, and the first indication information carries information required for activating the one or more first antenna panels, the terminal device activates the one or more first antenna panels; and/or if the first indication information is used to indicate the terminal device to deactivate one or more second antenna panels, and the first indication information includes information required for deactivating the one or more second antenna panels, the terminal device deactivates the one or more second antenna panels based on the first indication information.

In a possible implementation, the method further includes:

The terminal device receives first resource configuration information that is from the network device. The first resource configuration information is used to configure one or more reference signal resource sets, and each reference signal resource set is associated with one antenna panel.

Optionally, that each reference signal resource set is associated with one antenna panel may include any one of the following cases: An identifier of each reference signal resource set is associated with one antenna panel. An identifier of each reference signal resource set is associated with an identifier of one antenna panel. Each reference signal resource set is associated with an identifier of one antenna panel. This is not limited. In addition, the association relationship may be a one-to-one relationship or a one-to-many relationship. This is not limited.

In a possible implementation, if the first indication information is used to indicate the terminal device to activate the one or more first antenna panels, the method further includes: The terminal device obtains first time information. The first time information is used to indicate that the terminal device is to keep the one or more first antenna panels in an active state after a first time ends. The terminal device keeps, based on the first time information, the one or more first antenna panels in the active state after the first time ends. Therefore, the terminal device may keep the antenna panels in the active state after a period of time based on time sequence information indicated by the network device.

Optionally, if the first indication information is used to indicate the terminal device to activate the one or more first antenna panels, the method further includes: The terminal device obtains duration for keeping the one or more first antenna panels activated. The terminal device keeps the active state of the one or more first antenna panels within the duration. Therefore, the terminal device may keep the antenna panels in the active state for a period of time based on the activation duration indicated by the network device.

In a possible implementation, if the first indication information is used to indicate the terminal device to deactivate the one or more second antenna panels, the method further includes: The terminal device obtains second time information. The second time information is used to indicate that the terminal device deactivates the one or more second antenna panels after a second time. The terminal device performs a deactivation operation on the one or more second antenna panels after the second time.

Optionally, if the first indication information is used to indicate the terminal device to deactivate the one or more second antenna panels, the method further includes:

The terminal device obtains duration for keeping the one or more second antenna panels deactivated.

When deactivating the one or more second antenna panels, the terminal device keeps an inactive state of the one or more second antenna panels within the duration. Therefore, the terminal device may keep the antenna panels in the inactive state for a period of time based on the deactivation duration indicated by the network device.

In a possible implementation, the method further includes: The terminal device receives power control configuration that is of each of the one or more antenna panels and that is from the network device. Optionally, the power control configuration includes one or more of the following parameters: an open-loop power parameter, a closed-loop power parameter, a path loss compensation parameter, a power accumulation form, and an MCS power adjustment amount. Therefore, the network device may deliver the power control configuration of the antenna panel to the terminal device.

In a possible implementation, the method further includes: When calculating a transmit power of an antenna panel, the terminal device performs a zero-out operation on a closed-loop power adjustment amount corresponding to the antenna panel. The antenna panel is any one of the one or more antenna panels that need to be activated or deactivated and that are indicated by the network device.

In a possible implementation, the method further includes: The terminal device receives timing advance information that is of an antenna panel and that is from the network device. The timing advance information includes a timing advance, and the antenna panel is any one of the one or more antenna panels that need to be activated or deactivated and that are indicated by the network device.

Optionally, the timing advance information further includes timing advance adjustment information, and the timing advance adjustment information is used to indicate the terminal device to adjust the timing advance used for any antenna panel.

According to a third aspect, a network device is provided, and includes:

a receiving module, configured to receive capability information that is of an antenna panel and that is from a terminal device; and a sending module, configured to send first indication information to the terminal device, where the first indication information is used to indicate the terminal device to activate and/or deactivate one or more antenna panels.

Optionally, if the first indication information is used to indicate the terminal device to activate one or more first antenna panels, the first indication information carries information required for activating the one or more first antenna panels; and/or if the first indication information is used to indicate the terminal device to deactivate one or more second antenna panels, the first indication information includes information required for deactivating the one or more second antenna panels.

In a possible implementation, the sending module is further configured to send first resource configuration information to the terminal device, where the first resource configuration information is used to configure one or more reference signal resource sets, and each reference signal resource set is associated with one antenna panel.

In a possible implementation, if the first indication information is used to indicate the terminal device to activate the one or more first antenna panels, the sending module is further configured to send first time information to the terminal device, where the first time information is used to indicate that the terminal device is to keep the one or more first antenna panels in an active state after a first time ends.

Optionally, if the first indication information is used to indicate the terminal device to activate the one or more first antenna panels, the sending module is further configured to indicate, to the terminal device, duration for keeping the one or more first antenna panels activated.

In a possible implementation, if the first indication information is used to indicate the terminal device to deactivate the one or more second antenna panels, the sending module is further configured to send second time information to the terminal device, where the second time information is used to indicate that the terminal device deactivates the one or more second antenna panels after a second time.

Optionally, if the first indication information is used to indicate the terminal device to deactivate the one or more second antenna panels, the sending module is further configured to indicate, to the terminal device, duration for keeping the one or more second antenna panels deactivated.

In a possible implementation, the sending module is further configured to send power control configuration of each of the one or more antenna panels to the terminal device.

In a possible implementation, the sending module is further configured to send timing advance information of an antenna panel to the terminal device, where the timing advance information includes a timing advance, and the antenna panel is any one of the one or more antenna panels that need to be activated or deactivated and that are indicated by the network device.

Optionally, the timing advance information further includes timing advance adjustment information, and the timing advance adjustment information is used to indicate the terminal device to adjust the timing advance used for any antenna panel.

According to a fourth aspect, a terminal device is provided, and includes:

a sending module, configured to send capability information to a network device;

a receiving module, configured to receive first indication information that is from the network device, where the first indication information is used to indicate the terminal device to activate and/or deactivate one or more antenna panels; and a processing module, configured to: activate and/or deactivate the one or more antenna panels.

Optionally, the processing module is specifically configured to: if the first indication information is used to indicate the terminal device to activate one or more first antenna panels, and the first indication information carries information required for activating the one or more first antenna panels, activate the one or more first antenna panels; and/or if the first indication information is used to indicate the terminal device to deactivate one or more second antenna panels, and the first indication information includes information required for deactivating the one or more second antenna panels, deactivate the one or more second antenna panels.

In a possible implementation, the receiving module is further configured to:

receive first resource configuration information that is from the network device, where the first resource configuration information is used to configure one or more reference signal resource sets, and each reference signal resource set is associated with one antenna panel.

In a possible implementation, if the first indication information is used to indicate the terminal device to activate the one or more first antenna panels, the receiving module is further configured to:

obtain first time information, where the first time information is used to indicate that the terminal device is to keep the one or more first antenna panels in an active state after a first time ends.

The processing module is configured to keep the one or more first antenna panels in the active state after the first time ends.

Optionally, if the first indication information is used to indicate the terminal device to activate the one or more first antenna panels, the receiving module is further configured to obtain duration for keeping the one or more first antenna panels activated.

The processing module is configured to keep the active state of the one or more first antenna panels within the duration.

In a possible implementation, if the first indication information is used to indicate the terminal device to deactivate the one or more second antenna panels, the receiving module is further configured to obtain second time information, where the second time information is used to indicate that the terminal device deactivates the one or more second antenna panels after a second time.

The processing module is configured to perform a deactivation operation on the one or more second antenna panels after the second time.

Optionally, if the first indication information is used to indicate the terminal device to deactivate the one or more second antenna panels, the receiving module is further configured to obtain duration for keeping the one or more second antenna panels deactivated.

The processing module is configured to: when deactivating the one or more second antenna panels, keep an inactive state of the one or more second antenna panels within the duration.

In a possible implementation, the receiving module is further configured to receive power control configuration that is of each of the one or more antenna panels and that is from the network device.

In a possible implementation, the processing module is further configured to: when calculating a transmit power of an antenna panel, perform a zero-out operation on a closed-loop power adjustment amount corresponding to the antenna panel, where the antenna panel is any one of the one or more antenna panels that need to be activated or deactivated and that are indicated by the network device.

In a possible implementation, the receiving module is further configured to: receive timing advance information that is of an antenna panel and that is from the network device, where the timing advance information includes a timing advance, and the antenna panel is any one of the one or more antenna panels that need to be activated or deactivated and that are indicated by the network device.

Optionally, the timing advance information further includes timing advance adjustment information, and the timing advance adjustment information is used to indicate the terminal device to adjust the timing advance used for any antenna panel.

According to a fifth aspect, a communications apparatus is provided. The communications apparatus may be the network device in the foregoing method designs, or may be a chip disposed in the network device. The communications apparatus includes a processor, where the processor is coupled to a memory, and may be configured to execute an instruction in the memory, to implement the method performed by the network device in the first aspect and any possible implementation of the first aspect. Optionally, the communications apparatus further includes the memory. Optionally, the communications apparatus further includes a communications interface, and the processor is coupled to the communications interface.

When the communications apparatus is the network device, the communications interface may be a transceiver or an input/output interface.

When the communications apparatus is the chip disposed in the network device, the communications interface may be an input/output interface.

Optionally, the transceiver may be a transceiver circuit. Optionally, the input/output interface may be an input/output circuit.

According to a sixth aspect, a communications apparatus is provided. The communications apparatus may be the terminal device in the foregoing method designs, or may be a chip disposed in the terminal device. The communications apparatus includes a processor, where the processor is coupled to a memory, and may be configured to execute an instruction in the memory, to implement the method performed by the terminal device in the second aspect and any possible implementation of the second aspect. Optionally, the communications apparatus further includes the memory. Optionally, the communications apparatus further includes a communications interface, and the processor is coupled to the communications interface.

When the communications apparatus is the terminal device, the communications interface may be a transceiver or an input/output interface.

When the communications apparatus is the chip disposed in the terminal device, the communications interface may be an input/output interface.

Optionally, the transceiver may be a transceiver circuit. Optionally, the input/output interface may be an input/output circuit.

According to a seventh aspect, a program is provided. When being executed by a processor, the program is used to perform any method in the first aspect or the second aspect and the possible implementations of the first aspect or the second aspect.

According to an eighth aspect, a program product is provided. The program product includes program code. When the program code is run by a communications unit and a processing unit, or a transceiver and or a processor of a communications apparatus (for example, a network device or a terminal device), the communications apparatus is enabled to perform any method in the first aspect or the second aspect and the possible implementations of the first aspect or the second aspect.

According to a ninth aspect, a computer-readable medium is provided. The computer-readable medium stores a program, and the program enables a communications apparatus (for example, a network device or a terminal device) to perform any method in the first aspect or the second aspect and the possible implementations of the first aspect or the second aspect.

DESCRIPTION OF EMBODIMENTS

Figure 1:
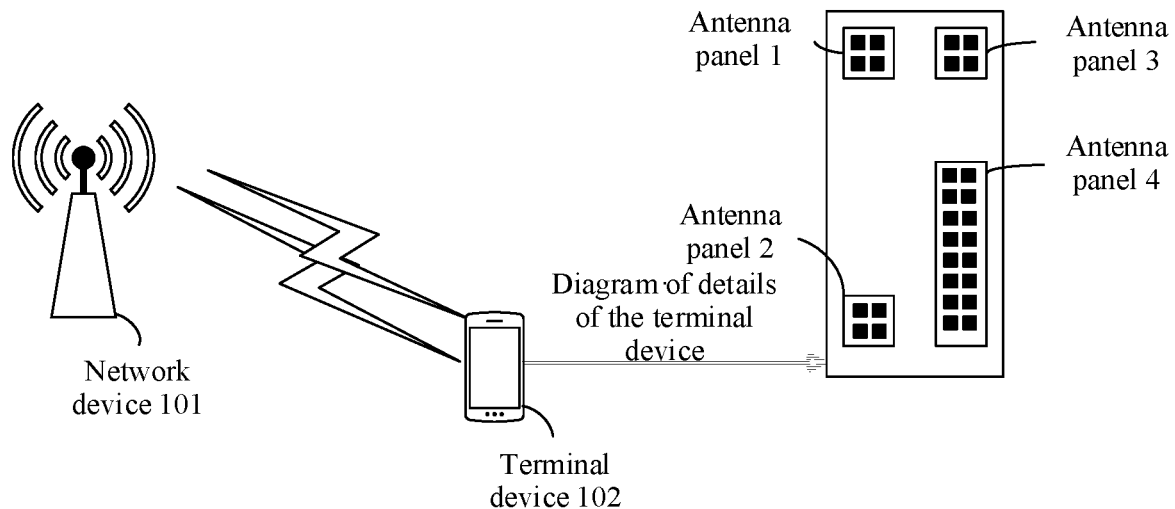
FIG. 1 is an architectural diagram of a system to which an embodiment of this application is applied.

The following describes technical solutions in this application with reference to the accompanying drawings.

The technical solutions of embodiments of this application may be applied to various communications systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments of this application.

A network device in the embodiments of this application may be a device configured to communicate with the terminal device. The network device may be a base transceiver station (BTS) in the global system for mobile communications (GSM) system or the code division multiple access (CDMA) system, or may be a NodeB (NB) in the wideband code division multiple access (WCDMA) system, an evolved NodeB (eNB, or eNodeB) in the LTE system, a gNB (including a gNB-CU and a gNB-DU) in the 5G system, or a radio controller in a cloud radio access network (CRAN) scenario. The network device may alternatively be a relay station, an access point, a vehicle-mounted device, a wearable device, a network device in the 5G network, a network device in the future evolved PLMN network, or the like. This is not limited in the embodiments of this application.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the execution body of the method provided in the embodiments of this application may be the terminal device, the network device, or a function module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or, medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, include, and/or carry an instruction and/or data.

The following briefly introduces or describes some terms or concepts in the embodiments of this application.

Antenna panel: A signal for wireless communication needs to be received and sent by an antenna, and a plurality of antenna elements may be integrated onto one antenna panel. One radio frequency link may drive one or more antenna elements. In the embodiments of this application, the terminal device may include a plurality of antenna panels, and each antenna panel includes one or more beams. The network device may also include a plurality of antenna panels, and each antenna panel includes one or more beams. The antenna panel may also be represented as an antenna array or an antenna subarray. One antenna panel may include one or more antenna arrays/subarrays. One antenna panel may be controlled by one or more oscillators. The radio frequency link may also be referred to as a receive channel and/or a transmit channel, a receiver branch, or the like. One antenna panel may be driven by one radio frequency link, or may be driven by a plurality of radio frequency links. Therefore, the antenna panel in the embodiments of this application may alternatively be replaced with a radio frequency link, a plurality of radio frequency links driving one antenna panel, or one or more radio frequency links controlled by one oscillator.

A beam is a communication resource. The beam may be a wide beam, a narrow beam, or a beam of another type. A technology for forming a beam may be a beamforming technology or another technology. The beamforming technology may be specifically a digital beamforming technology, an analog beamforming technology, or a hybrid digital/analog beamforming technology. Different beams may be considered as different resources. A communications device (including the terminal device and the network device) may send same information or different information through different beams. Optionally, a plurality of beams that have same or similar communication features may be considered as one beam. One beam may include one or more antenna ports, configured to transmit a data channel, a control channel, a sounding signal, and the like. For example, a transmit beam may be distribution of signal strength formed in different directions in space after a signal is transmitted by using an antenna, and a receive beam may be distribution of signal strength, in different directions in space, of a radio signal received from an antenna. It may be understood that, one or more antenna ports forming one beam may also be considered as an antenna port set. In a protocol, the beam may also be represented as a spatial filter.

A beam management resource is a resource used for beam management, and may also be represented as a resource used to calculate and measure beam quality. The beam quality includes a layer 1 reference signal received power (L1-RSRP), layer 1 reference signal received quality (L1-RSRQ), and the like. Specifically, the beam management resource may include a synchronization signal, a broadcast channel, a downlink channel measurement reference signal, a tracking signal, a downlink control channel demodulation reference signal, a downlink shared channel demodulation reference signal, an uplink sounding reference signal, an uplink random access signal, and the like.

The beam quality may be measured by using measurement indicators such as a reference signal received power (RSRP), a block error rate (BLER), reference signal received quality (RSRQ), a received signal strength indicator (RSSI), a signal to interference and noise ratio (SINR), a channel quality indicator (CQI), and a correlation. It should be understood that the measurement indicators of the beam quality are not limited in the embodiments of this application.

FIG. 1 is an architectural diagram of a system 100 to which an embodiment of this application is applied. As shown in FIG. 1, the system 100 includes a network device 101 and a terminal device 102. The terminal device 102 may be equipped with a plurality of antenna panels (In FIG. 1, an example in which the terminal device 102 includes four antenna panels is used for description, but does not limit a quantity of antenna panels of the terminal device). The antenna panels may cover different directions, and each antenna panel may generate one or more beams. If the terminal device simultaneously uses a plurality of antenna panels, omnidirectional sending and receiving can be implemented. Optionally, the network device 101 may also include a plurality of antenna panels.

The network device 101 and the terminal device 102 may perform data transmission by using a beam. For example, the network device 101 sends data in a direction or beam, and the terminal device 102 also needs to receive the data in a corresponding direction or beam. Alternatively, the terminal device 102 sends data in a direction or beam, and the network device 101 also needs to receive the data in a corresponding direction or beam.

Communication from the network device 101 to the terminal device 102 is downlink communication, and communication from the terminal device 102 to the network device 101 is uplink communication. According to the long term evolution LTE/NR protocol, at a physical layer, uplink communication includes transmission of an uplink physical channel and an uplink signal. The uplink physical channel includes a physical random access channel (PRACH), a physical uplink control channel (PUCCH), a physical uplink shared channel (PUSCH), and the like. The uplink signal includes a channel sounding signal SRS, a physical uplink control channel demodulation reference signal (PUCCH demodulation reference signal, PUCCH-DMRS), a physical uplink shared channel demodulation reference signal PUSCH-DMRS, an uplink phase noise tracking reference signal (PTRS). The downlink communication includes transmission of a downlink physical channel and a downlink signal. The downlink physical channel includes a physical broadcast channel (PBCH), a physical downlink control channel (PDCCH), a physical downlink shared channel (PDSCH), and the like. The downlink signal includes a primary synchronization signal (PSS)/secondary synchronization signal (SSS), a physical downlink control channel demodulation reference signal PDCCH-DMRS, a physical downlink shared channel demodulation reference signal PDSCH-DMRS, a phase noise tracking reference signal PTRS, a channel state information reference signal (CSI-RS), a cell reference signal (CRS) (not available in NR), a fine synchronization signal (FSS) (not available in LTE), and the like. In NR, a beam indicator of a beam used by a downlink signal or a beam indicator of a beam sending a reference signal is implemented by associating with a reference resource index in a transmission configuration indicator (TCI) status table.

It should be noted that the wireless communications system 100 shown in FIG. 1 is merely intended to more clearly describe technical solutions in this application, but is not intended to limit this application. A person of ordinary skill in the art may know that as a network architecture evolves and a new service scenario emerges, the technical solutions provided in this application are further applicable to a similar technical problem.

In a communications system, a network device can obtain more information than a terminal device. To assist the terminal device in better managing an antenna panel, the embodiments of this application provide a method for managing an antenna panel. The network device obtains capability information that is of the antenna panel and that is supported by the terminal device, to determine an antenna panel to be activated or deactivated by the terminal device. In this way, a problem such as a power waste or a communication performance loss of the terminal device that may be caused by insufficient information can be avoided.

Figure 2:
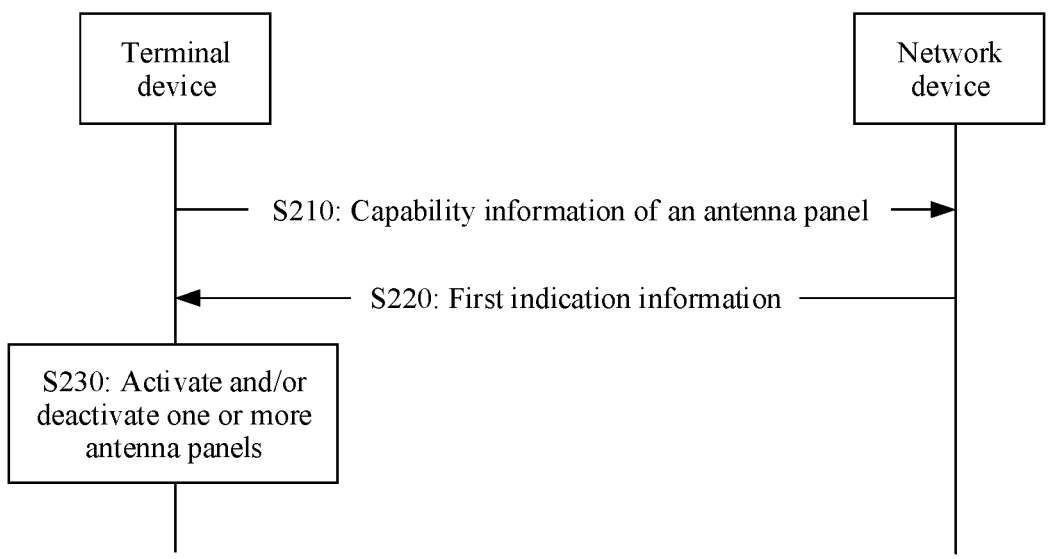
FIG. 2 is a schematic flowchart of a method for managing an antenna panel according to an embodiment of this application.

FIG. 2 is a schematic flowchart of a method 200 for managing an antenna panel according to an embodiment of this application. Optionally, a terminal device in the method 200 may be the terminal device 102 in FIG. 1, and a network device in the method 200 may be the network device 101 in FIG. 1. As shown in FIG. 2, the method 200 includes the following steps.

S210: The terminal device sends capability information to the network device. Correspondingly, the network device receives the capability information that is from the terminal device.

The capability information is information about a capability that is of an antenna panel and that is supported by the terminal device. The antenna panel may be a reference signal resource set. The capability information includes one or more of the following:

a total quantity of antenna panels of the terminal device;

a quantity of antenna panels that can be simultaneously activated by the terminal device;

a turn-on time of the antenna panel of the terminal device;

a switching time required for the terminal device to switch the antenna panel;

a quantity of beams on the antenna panel of the terminal device, where the quantity of antenna panels of the terminal device includes a quantity of transmit antenna panels of the terminal device and/or a quantity of receive antenna panels of the terminal device;

a quantity of receive antenna panels or transmit antenna panels that can be simultaneously used by the terminal device;

a quantity of beams that can be processed by each antenna panel of the terminal device, where the quantity of beams that can be processed by each antenna panel of the terminal device includes a quantity of beams that can be received by each receive antenna panel of the terminal device, or a quantity of beams that can be sent by each transmit antenna panel of the terminal device;

a quantity of receive antenna panel groups of the terminal device, and/or a quantity of receive antenna panels included in each receive antenna panel group and/or an identifier of the receive antenna panel included in each receive antenna panel group;

a quantity of transmit antenna panel groups of the terminal device, and/or a quantity of transmit antenna panels included in each transmit antenna panel group and/or an identifier of the transmit antenna panel included in each transmit antenna panel group;

at least one of the following capabilities of the terminal device for switching the receive antenna panel: a time interval at which the terminal device switches the receive antenna panel, and a quantity of times that the terminal device switches the receive antenna panel within a preset time period;

at least one of the following capabilities of the terminal device for switching the transmit antenna panel: a time interval at which the terminal device switches the transmit antenna panel, and a quantity of times that the terminal device switches the transmit antenna panel within a preset time period;

at least one of the following capabilities of the terminal device for switching from the receive antenna panel to the transmit antenna panel:

when the receive antenna panel and the transmit antenna panel are a same antenna panel, a time interval at which the terminal device switches from a receive mode to a transmit mode, or when the receive antenna panel and the transmit antenna panel are different antenna panels, a time interval at which the terminal device switches from a receive mode to a transmit mode, a quantity of times that the terminal device switches from the receive mode to the transmit mode on the same antenna panel within a preset time period, and a quantity of times that the terminal device switches from the receive mode to the transmit mode between different antenna panels within a preset time period;

at least one of the following capabilities of the terminal device for switching from the transmit antenna panel to the receive antenna panel:

when the receive antenna panel and the transmit antenna panel are a same antenna panel, a time interval at which the terminal device switches from a transmit mode to a receive mode, or when the receive antenna panel and the transmit antenna panel are different antenna panels, a time interval at which the terminal device switches from the transmit mode to the receive mode, a quantity of times that the terminal device switches from the transmit mode to the receive mode on the same antenna panel within a preset time period, and a quantity of times that the terminal device switches from the transmit mode to the receive mode between different antenna panels within a preset time period.

The quantity of beams on the antenna panel may be understood based on the following case: If quantities of beams on all antenna panels are the same, the terminal device may report the quantity of beams that are on any antenna panel. Therefore, the quantity of beams on the antenna panel may be construed as the quantity of beams on any antenna panel. If quantities of beams on all antenna panels are different, the terminal device needs to report the quantity of beams that are on each antenna panel. Therefore, the quantity of beams on the antenna panel may be construed as the quantity of beams on each antenna panel.

Optionally, a quantity of channel state information reference signal (CSI-RS) resource sets of the terminal device may be a quantity of CSI-RS resource sets used for antenna panel management. For example, that CSI-RS Set Use=antenna panel management is defined.

Optionally, a quantity of channel sounding reference signal (SRS) resource sets of the terminal device may be a quantity of SRS resource sets used for antenna panel management. For example, that SRS Set Use=antenna panel management is defined.

Optionally, the terminal device may implicitly indicate information about the antenna panel by using group information. In other words, the terminal device may group a plurality of antenna panels in a specific manner, to indicate restrictions on antenna panel activation. For example, antenna panels in a same group may be turned on at the same time, and antenna panels in different groups may not be turned on at the same time. Alternatively, for another example, antenna panels in a same group may not be turned on at the same time, and antenna panels in different groups may be turned on at the same time.

Optionally, the terminal device may alternatively indirectly indicate the information about the antenna panel by using another parameter. For example, the information about the antenna panel may be indicated by using related information of a resource set (for example, the SRS resource set, the reference signal resource set, or a synchronization signal block resource set). For example, the terminal device may report a quantity of SRS resource sets that are recommended to be configured, a quantity of SRS resource sets that can be simultaneously activated/validated, a minimum transmission time interval of SRS resources that are from different SRS resource sets, a minimum time offset for activating an AP and/or an SP SRS resource set, and a quantity of SRS resources in each SRS resource set. For another example, the related information may be a quantity of CSI-RS resource sets that can be simultaneously received by the terminal device.

After receiving the capability information, the network device may select, for the terminal device based on the capability information, an antenna panel that needs to be activated and/or deactivated.

S220: The network device sends first indication information to the terminal device. The first indication information is used to indicate the terminal device to activate and/or deactivate one or more antenna panels.

A method for notifying, by the network device, the terminal device of the first indication information is not limited in this embodiment of this application.

The first indication information may be used to indicate the terminal device to activate one or more first antenna panels, and/or used to indicate the terminal device to deactivate one or more second antenna panels. Herein, the sequence numbers "first" and "second" are introduced to facilitate distinguishing between an activated antenna panel and a deactivated antenna panel, and do not constitute a limitation on this embodiment of this application.

Optionally, if the first indication information is used to indicate the terminal device to activate the one or more first antenna panels, the first indication information carries information required by the terminal device to activate the one or more first antenna panels. In this case, the first indication information may be understood as an antenna panel activation command. Optionally, the first indication information may include one or more of the following: indication information used to distinguish whether the first indication information is for activating an antenna panel or deactivating an antenna panel, antenna panel identification information, antenna panel activation duration, an antenna panel activation time offset, antenna panel activation information, an antenna panel activation mode, antenna panel power control adjustment information, antenna panel timing advance (antenna panel TA) adjustment information, antenna panel activation priority information, and the like.

The antenna panel activation mode may include the following cases:

Case 1: The antenna panel may continuously work. To be specific, after receiving an activation command for an antenna panel, the terminal device needs to keep an active state of the antenna panel until the terminal device receives a deactivation command for the antenna panel.

Case 2: The antenna panel of the terminal device may work through dynamic activation. To be specific, after an antenna panel of the terminal device enters an active state, within a time period T, if the terminal device is not indicated by the network device to perform uplink signal transmission by using the antenna panel, where the uplink signal transmission includes but is not limited to uplink reference signal transmission and/or uplink shared channel transmission and/or uplink control channel transmission and/or physical random access channel transmission, the antenna panel may enter an inactive state.

Case 3: After an antenna panel of the terminal device enters an active state, within a time period T, if the terminal device is not indicated by the network device to perform downlink signal reception by using the antenna panel, where the downlink signal reception includes but is not limited to downlink reference signal reception and/or synchronization signal reception and/or downlink shared channel reception and/or downlink control channel reception and/or downlink broadcast channel reception, the antenna panel may enter an inactive state.

Case 4: This working mode is a combination of the foregoing two working modes. After an antenna panel of the terminal device enters an active state, within a time period T, if the terminal device is not indicated by the network device to perform downlink signal reception and/or uplink signal transmission by using the antenna panel, the antenna panel may enter an inactive state. The time period T may be configured by the network device, agreed on in a protocol, or included in the capability information.

Case 5: The network device configures a time length of a timer, to count down an antenna panel deactivation time. The timer starts counting down from activation of an antenna panel. If the network device indicates the terminal device to transmit or receive a signal by using the antenna panel, the timer is reset to an initial value configured by the network device. When the timer is reset, the terminal device may deactivate the antenna panel.

Optionally, if the first indication information is used to indicate the terminal device to deactivate the one or more second antenna panels, the first indication information carries information required by the terminal device to deactivate the one or more second antenna panels. In this case, the first indication information may be understood as an antenna panel deactivation command. Optionally, the first indication information may include one or more of the following: indication information used to distinguish whether the first indication information is for activating an antenna panel or deactivating an antenna panel, antenna panel identification information, antenna panel deactivation information, an antenna panel deactivation time offset, antenna panel deactivation duration, an antenna panel deactivation mode, antenna panel power control adjustment information, antenna panel timing advance (antenna panel TA) adjustment information, antenna panel deactivation priority information, and the like.

Optionally, if the first indication information indicates not only the one or more first antenna panels that need to be activated by the terminal device, but also the one or more second antenna panels that need to be deactivated by the terminal device, the first indication information carries the information required by the terminal device to activate the one or more first antenna panels, and/or the information required by the terminal device to deactivate the one or more second antenna panels.

It should be noted that the network device may indicate, by using same signaling, the terminal device to activate the first antenna panel and deactivate the second antenna panel, or may separately indicate, by using different signaling, the terminal device to activate the first antenna panel and deactivate the second antenna panel. This is not limited.

S230: The terminal device activates and/or deactivates the one or more antenna panels based on the first indication information.

Specifically, if the first indication information is used to indicate the terminal device to activate one or more first antenna panels, the terminal device activates the one or more first antenna panels based on content carried in the first indication information; and/or if the first indication information is used to indicate the terminal device to deactivate the one or more second antenna panels, the terminal device deactivates the one or more second antenna panels based on content carried in the first indication information.

If an antenna panel is in an active state, the terminal device is allowed to send or receive one or more of an uplink control channel, an uplink shared channel, a downlink control channel, a downlink shared channel, a random access channel, a physical broadcast channel, an uplink reference signal, a downlink reference signal, a synchronization signal block, and the like by using the activated antenna panel.

If an antenna panel is in an inactive state, the terminal device does not send or receive one or more of an uplink control channel, an uplink shared channel, a downlink control channel, a downlink shared channel, a random access channel, a physical broadcast channel, an uplink reference signal, a downlink reference signal, a synchronization signal block, and the like by using the deactivated antenna panel. The terminal device does not expect that the network device configures the terminal device to send or receive the foregoing signal and channel by using the antenna panel currently in the inactive state, either. At the same time, the terminal device does not expect that the network device configures the terminal device to send or receive one or more of an uplink control channel, an uplink shared channel, a downlink control channel, a downlink shared channel, a random access channel, a physical broadcast channel, an uplink reference signal, a downlink reference signal, a synchronization signal block, and the like by using antenna panels whose quantity exceeds a quantity of antenna panels currently in the active state and/or a maximum quantity of activated antenna panels reported by the terminal device and/or a quantity of antenna panels reported by the terminal device.

In this embodiment of this application, the terminal device sends the capability information to the network device, so that the network device can learn of the capability that is of the antenna panel and that is supported by the terminal device. The network device selects an activate antenna panel and/or a deactivated antenna panel for the terminal device based on the capability information, and sends the first indication information to the terminal device, so that the terminal device learns of a decision of the network device. In this way, the network device participates in antenna panel management, and this avoids a power waste caused by turning on a plurality of antenna panels by the terminal device at an unnecessary time, and also avoids a communication performance loss caused by a fact that the terminal device does not activate the plurality of antenna panels when the antenna panels need to be turned on, thereby helping the terminal device better use the antenna panels.

In step S220, optionally, the network device may send the first indication information to the terminal device by using higher layer signaling, a MAC-CE message, or DCI, to indicate the terminal device to activate or deactivate the one or more antenna panels.

Optionally, in an embodiment, the network device sends the first indication information by using RRC signaling. For example, a list or a set may be configured to indicate antenna panel activation and deactivation information. Specifically, the network device may include an activated antenna panel list in the RRC signaling, to indicate which antenna panels are in the active state and indicate corresponding activation information; and/or may include a deactivated antenna panel list in the RRC signaling, to indicate which antenna panels are in the inactive state and indicate corresponding deactivation information.

Optionally, in an embodiment, the network device sends the first indication information by using the MAC-CE message. The MAC-CE message includes one or more of the following: indication information used to distinguish whether the first indication information is for activating an antenna panel or deactivating an antenna panel, antenna panel identification information, antenna panel activation duration, an antenna panel activation time offset, antenna panel deactivation information, an antenna panel deactivation time offset, antenna panel deactivation duration, an antenna panel activation mode, antenna panel power control adjustment information, antenna panel timing advance (TA) adjustment information, antenna panel activation priority information, and the like.

Optionally, in an embodiment, the network device sends the first indication information by using the DCI. For example, information about the activated antenna panel and the deactivated antenna panel may be indicated by using a DCI field, a DCI format, and a special value of the DCI field. For another example, a format that is used to perform bandwidth part (BWP) switching and that is in the DCI may be used to indicate antenna panel switching.

When the network device schedules, by using a DCI format 0_1, the terminal device to send data on the uplink shared channel, one or more of the following conditions should be met:

SRS resources in an SRS resource set corresponding to an SRS resource indicator in the DCI field correspond to a same antenna panel;

uplink reference signals and/or downlink reference signals included in SRS-SpatialRelationInfo of SRS resources in the SRS resource set corresponding to the SRS resource indicator in the DCI field correspond to a same antenna panel;

an antenna panel corresponding to an SRS resource in the SRS resource set corresponding to the SRS resource indicator in the DCI field is in the active state; and a quantity of antenna panels corresponding to SRS resources in the SRS resource set corresponding to the SRS resource indicator in the DCI field is not greater than the maximum quantity of activated antenna panels reported by the terminal device and/or the quantity of antenna panels reported by the terminal device and/or the quantity of antenna panels currently activated by the terminal device.

It should be uniformly noted that in this embodiment of this application, an identifier of the antenna panel may be represented in a plurality of forms. For example, the network device configures antenna panel IDs as identifiers for different antenna panels of the terminal device. For another example, the terminal device may associate different antenna panel IDs with antenna panels. Optionally, the identifier of the antenna panel may be represented by an identifier of the reference signal resource set (and/or an identifier of the synchronization signal block resource set), such as an SRS resource set ID or a CSI-RS resource set ID, or may be an identifier of a reference signal resource (and/or an identifier of a synchronization signal block resource), such as an SRS resource ID or a CSI-RS resource ID. When the identifier of the antenna panel is an identifier of the reference signal resource or the reference signal resource set, if the identifier is an identifier of an uplink reference signal resource (or resource set), the identifier corresponds to an antenna panel of the terminal device that sends the uplink reference signal resource (or resource set); if the identifier is an identifier of a downlink reference signal resource and/or a synchronization signal resource, the identifier corresponds to an antenna panel of UE that receives the downlink resource and/or the synchronization signal resource.

Optionally, the method 200 further includes:

The network device sends first resource configuration information to the terminal device. The first resource configuration information is used to configure one or more reference signal resource sets, and each reference signal resource set is associated with one antenna panel (for example, an antenna panel ID).

Optionally, that each reference signal resource set is associated with one antenna panel may include any one of the following cases: An identifier of each reference signal resource set is associated with one antenna panel. An identifier of each reference signal resource set is associated with an identifier of one antenna panel. Each reference signal resource set is associated with an identifier of one antenna panel. This is not limited. In addition, the association relationship may be a one-to-one relationship or a one-to-many relationship. This is not limited.

Specifically, the network device may indicate or associate one or more antenna panel IDs for one or more uplink and downlink reference signal resources (or resource sets) and/or uplink and downlink physical channels. A value range of the antenna panel ID may be determined by using the antenna panel capability information or other information reported by the terminal device. For example, the network device may associate the antenna panel ID with an SRS resource set that is in the RRC signaling, to indicate that on an SRS resource in the SRS resource set, data or a signal needs to be sent by using an antenna panel corresponding to the antenna panel ID. Similarly, the network device may alternatively configure a plurality of SRS resource sets as one SRS resource setting, and associate the resource setting with one antenna panel ID.

It should be understood that an example in which the identifier of each reference signal resource set is associated with the identifier of the antenna panel is used for description herein. Actually, the antenna panel may be implicitly indicated by using the identifier of the reference signal resource set, and the identifier of the antenna panel does not need to be introduced. This is not specifically limited in this embodiment of this application.

Optionally, the network device may further send second resource configuration information to the terminal device. The second resource configuration information is used to configure an association relationship between one or more component carriers (CC) and one or more antenna panels, and/or the second resource configuration information is used to configure an association relationship between a BWP and one or more antenna panels. In other words, one or more antenna panels may be associated with one or more CCs, and/or one or more antenna panels may be associated with one or more BWPs.

For the terminal device, for example, when the terminal device switches to one BWP, the terminal device needs to activate an antenna panel corresponding to the BWP. When the terminal device switches from the BWP to another BWP, the terminal device needs to deactivate the antenna panel corresponding to the BWP that exists before the switching. For another example, when a CC of the terminal device is activated, the terminal device needs to activate an antenna panel corresponding to the CC. When the CC enters an inactive state, the terminal device needs to deactivate the antenna panel corresponding to the CC. Optionally, the terminal device needs to receive and send, by using an antenna panel associated with a BWP/CC, a corresponding reference signal or channel on the BWP/CC.

Optionally, the network device may also activate the configured reference signal resource set, and the terminal device needs to activate a corresponding antenna panel. For example, if the network device may activate resource sets corresponding to some of SRS resource set/setting IDs, the terminal device needs to activate antenna panels corresponding to the resource sets corresponding to the SRS resource set/setting IDs, that is, antenna panels whose quantity is corresponding to that of the SRS resource set/setting IDs, or antenna panels used to send resources corresponding to the SRS resource set/setting IDs.

Optionally, the network device may associate one or more channels of the terminal device with one or more antenna panels, where the channels include one or more of an uplink control channel, an uplink shared channel, a downlink control channel, a downlink shared channel, a random access channel, a physical broadcast channel, an uplink reference signal, and a downlink reference signal, a synchronization signal block, and the like. The network device may alternatively associate transmit beams or receive beams of one or more of the foregoing channels with one or more antenna panels. The network device may associate one or more of a beam failure detection resource set, a link failure detection resource set, a candidate beam set obtained after a beam failure, and a random access resource with one or more antenna panels.

Optionally, the network device may associate one or more transmission configuration indicator (TCI) states of the terminal device with one or more antenna panels of the terminal device. For example, when the network device configures or activates a TCI state of the terminal device by using RRC and/or a MAC-CE, the terminal device may activate or deactivate an antenna panel based on antenna panel information associated with the configured or activated TCI state. Optionally, an association relationship between the TCI state and the antenna panel may be configured by using the RRC or the MAC-CE (for example, an association table or a TCI group), or an antenna panel index may be directly included in the TCI state. A possible association form is shown in the following Table 1:

TABLE 1

Association relationship between an antenna panel ID and a TCI-ID

| Antenna panel ID | TCI-ID |
| --- | --- |
| Antenna panel ID x, Antenna panel ID y | TCI-ID a, TCI-ID b |
| Antenna panel ID z | TCI-ID c |
| Antenna panel ID p, Antenna panel ID q | TCI-ID d |
| Antenna panel ID m | TCI-ID e, TCI-ID f |

It can be learned from Table 1 that the Antenna panel ID x and the Antenna panel ID y may be associated with the TCI-ID a and the TCI-ID b; the Antenna panel ID z may be associated with the TCI-ID c; the Antenna panel ID p and the Antenna panel ID q may be associated with the TCI-ID d; the Antenna panel ID m may be associated with both the TCI-ID e and the TCI-ID f. A quantity of antenna panel IDs and/or TCI-IDs is not limited in the foregoing association relationship. To be specific, the antenna panel IDs and the TCI-IDs may be in a one-to-one association relationship, in a many-to-one association relationship, in a one-to-many association relationship, or in a many-to-many association relationship.

It should be understood that the association relationship in Table 1 is merely used as an example for description herein, and constitutes no limitation on this embodiment of this application.

Similarly, the network device may indicate, by configuring a spatial relationship of an SRS, an antenna panel corresponding to the SRS. For example, the network device may include one or more antenna panel IDs in a beam indicator SRS-SpatialRelationInfo of the SRS resource or RRC configuration of the SRS resource, to indicate a corresponding antenna panel for sending the SRS and/or a corresponding antenna panel for sending a PUSCH indicated by the SRS. Optionally, the network device may configure a quantity of antenna panels for sending the SRS or antenna panels for sending an indicated channel in an SRS resource set used for codebook and/or non-codebook transmission, to indicate a quantity of antenna panels that need to be used to send the SRS and/or send the PUSCH indicated by the SRS.

Optionally, the network device sets different priorities for all the antenna panels by configuring or agreeing on a rule (for example, a value of an antenna panel ID corresponds to a corresponding priority order). The first indication information of the network device may not include a specific antenna panel ID, and the terminal device activates or deactivates different antenna panels autonomously or based on a priority order. Alternatively, the network device may indicate, in the first indication information, a quantity of antenna panels that need to be activated/deactivated, and the terminal device activates or deactivates a specified quantity of different antenna panels autonomously or based on a priority order. Alternatively, the network device may indicate, in the activation command or the deactivation command, a quantity of antenna panels that currently need to be kept in the active state. The terminal device keeps activating a specified quantity of different antenna panels autonomously or based on a priority order, and may deactivate a remaining antenna panel. Optionally, a default antenna panel (for example, an initially accessed antenna panel or an antenna panel corresponding to a specific antenna panel ID) may be configured by the network device or agreed on in a protocol. When an antenna panel for sending or receiving a reference signal or a channel is not indicated to the terminal device, the terminal device needs to send or receive the reference signal or the channel by using the default antenna panel.

In this embodiment of this application, the terminal device may further obtain time sequence information for activating the antenna panel and/or time sequence information for deactivating the antenna panel. Details are described below. A moment N at which the terminal device receives a command used to indicate to activate or deactivate an antenna panel #a may be defined in the following several possible manners: If the activation/deactivation command is a MAC-CE message, the moment N is a last slot (or a last OFDM symbol, subframe, frame, or the like) in which the terminal device sends an ACK/NACK corresponding to the MAC-CE message. If the activation/deactivation command is triggered by DCI, the moment N is a last OFDM symbol (or slot, subframe, frame, or the like) of a PDCCH on which the DCI is located. It should be understood that the time sequence information may be predefined in a protocol, or may be configured by the network device for the terminal device, or may be a value reported by the terminal device based on a capability of the terminal device. This is not specifically limited. It should be further understood that the time sequence information includes a time (for example, a first time, a second time, a third time, a fourth time, or another letter or value that indicates a time in the following), and the time may be an absolute time length or may be a relative time length. This is not limited. Optionally, a time unit may be a time measurement unit such as a symbol, a subframe, a slot, a mini-slot, a millisecond, or a second. It should be understood that the time unit is merely listed herein as an example, and is not intended to limit this embodiment of this application. A person skilled in the art may learn of other time measurement units, which are all applicable to this embodiment of this application.

It is assumed that the terminal device receives the first indication information at the moment N, where the first indication information is used to indicate the terminal device to activate the one or more first antenna panels. The following describes a time sequence behavior of performing a related antenna panel activation operation by the terminal device based on related time sequence information. Optionally, the method 200 further includes:

The terminal device obtains first time information. The first time information is used to indicate that the terminal device is to keep the one or more first antenna panels in an active state after a first time ends.

Optionally, the first time information may be sent by the network device to the terminal device, or may be agreed on in a protocol. If the first time information is sent by the network device to the terminal device, the first time information may be carried in the first indication information, or may be separately delivered by the network device to the terminal device. This is not limited.

After obtaining the first time information, when receiving an activation command (that is, the first indication information) of the network device, the terminal device needs to send and/or receive a signal by using an activated antenna panel after the first time. To implement the foregoing behavior, the terminal device needs to successfully activate, within the first time, the antenna panel indicated by the activation command.

Optionally, in an implementation, if the first antenna panel is already in the active state before the first time ends, the terminal device continues to keep the active state of the first antenna panel. If the first antenna panel is not in the active state, the terminal device performs an activation operation after the first time ends, to activate the first antenna panel. In other words, if the first antenna panel is not in the active state, the terminal device activates the antenna panel after waiting for the first time.

For example, the terminal device receives an antenna panel activation command used to indicate to activate the antenna panel #a, and an effective time carried in the activation command is T1. The effective time T1 may be understood as follows: When the terminal device receives the activation command at the moment N, the antenna panel #a needs to be in the active state at a moment N+T1. The terminal device needs to change a state of the antenna panel #a to the active state within the time T1, to transmit and/or receive a signal by using the antenna panel #a.

Optionally, in another implementation, the first time information is used to indicate that the terminal device may perform an activation operation on the one or more first antenna panels after waiting for the first time. In other words, after obtaining the first time information, the terminal device needs to activate the one or more first antenna panels after the first time ends.

Optionally, after activating the antenna panels, the terminal device may keep the active state of the antenna panels for a period of time. Specifically, the method 200 further includes:

The terminal device obtains duration (which may be referred to as activation duration) for keeping the one or more first antenna panels activated.

When activating the one or more first antenna panels, the terminal device keeps the active state of the one or more first antenna panels within the duration.

Optionally, the activation duration may be sent by the network device to the terminal device, or may be agreed on in a protocol. If the activation duration is sent by the network device to the terminal device, the activation duration may be carried in the first indication information, or may be separately delivered by the network device to the terminal device. This is not limited.

Optionally, the activation duration may be implemented by using a timer. For example, after activating an antenna panel corresponding to the antenna panel #a, the terminal device may keep a timer or an effective time window for the activated antenna panel. When the activated antenna panel enters an active state, the timer starts timing. After the timer reaches activation duration (in other words, in an overdue state), the activated antenna panel enters an inactive state.

Optionally, if the terminal device sends a signal and/or receives a signal by using the antenna panel #a, the timer restarts timing. Optionally, the signal may be one or more of the following signals: an uplink control channel, an uplink shared channel, a random access channel, a downlink control channel, a downlink shared channel, a physical broadcast channel, an uplink reference signal, a downlink reference signal, a synchronization signal, a fine synchronization signal (FSS), and the like. Alternatively, the terminal device may send a signal and/or receive a signal by preferentially using the antenna panel #a before the timer expires.

Optionally, after the timer expires, the terminal device may switch to a default antenna panel. The default antenna panel may be specified by the network device for the terminal device. For example, the default antenna panel may be an antenna panel with a smallest antenna panel ID, an antenna panel whose antenna panel ID is 0, an antenna panel used during initial access, or a previous activated antenna panel. Alternatively, after the timer expires, the terminal device may enter a DRX and/or DRT state. The antenna panel #a switches between the active state and the inactive state periodically.

When the terminal device receives the antenna panel activation command, and the quantity of antenna panels in the active state exceeds the maximum quantity of activated antenna panels reported by the terminal device, the terminal device selects, from currently activated antenna panels, an antenna panel that is first activated to perform deactivation.

A start point of the activation duration may be the moment N at which the activation command is received, or may be an end point of the first time.

It is assumed that the terminal device receives the first indication information at the moment N, where the indication information is used to indicate the terminal device to deactivate the one or more second antenna panels. The following describes a time sequence behavior of performing a related antenna panel deactivation operation by the terminal device based on related time sequence information. Optionally, the method 200 further includes:

The terminal device obtains second time information. The second time information is used to indicate that the terminal device deactivates the one or more second antenna panels after a second time.

After receiving the first indication information, the terminal device starts to perform a deactivation operation on the one or more second antenna panels after waiting for the second time. In other words, after the terminal device receives an instruction for deactivating the one or more second antenna panels at the moment N, if the second time is T4, the terminal device may deactivate the one or more second antenna panels after a moment N+T4.

Optionally, the second time information may be sent by the network device to the terminal device, or may be agreed on in a protocol. If the second time information is sent by the network device to the terminal device, the second time information may be carried in the first indication information, or may be separately delivered by the network device to the terminal device. This is not limited.

After obtaining the second time information, when receiving the deactivation command (that is, the first indication information) of the network device, the terminal device may perform, after waiting for the second time, a deactivation operation on the antenna panel indicated by the deactivation command.

Optionally, the method 200 further includes:

The terminal device obtains duration (which may be referred to as deactivation duration) for keeping the one or more second antenna panels deactivated. The deactivation duration is used to indicate that when deactivating the one or more second antenna panels, the terminal device may keep an inactive state of the one or more second antenna panels within the deactivation duration.

Optionally, the deactivation duration may be sent by the network device to the terminal device, or may be agreed on in a protocol. If the deactivation duration is sent by the network device to the terminal device, the deactivation duration may be carried in the first indication information, or may be separately delivered by the network device to the terminal device. This is not limited.

After obtaining the deactivation duration, when deactivating the one or more second antenna panels, the terminal device keeps the inactive state of the one or more second antenna panels within the deactivation duration.

Optionally, the deactivation duration may be implemented by using a timer. For example, after deactivating an antenna panel corresponding to the antenna panel #a, the terminal device may keep a timer or an effective time window for the deactivated antenna panel. When the deactivated antenna panel enters an inactive state, the timer starts timing. After the timer reaches deactivation duration (in other words, in an overdue state), the terminal device may switch to the default antenna panel, or re-activate the antenna panel #a.

A start point of the deactivation duration may be the moment N at which the deactivation command is received, or may be an end point of the second time. This is not limited.

Optionally, the foregoing time sequence process may be further applied to an antenna panel switching or antenna panel association indication, and switching and validation of the antenna panel switching or antenna panel association indication may be considered as an activation behavior. For example, the network device may indicate, by using the indication information, the terminal device to replace the original antenna panel #a that is in the antenna panel association relationship for the reference signal resource or the physical channel with an antenna panel #b. The validation of the association relationship that exists after the switching may be equivalent to an activation process of the antenna panel #b, and the process is specifically as follows:

After obtaining third time information, when receiving an association relationship switching command (for example, a MAC-CE message) of the network device, the terminal device needs to send and/or receive a signal by using a switched antenna panel (the antenna panel #b in this example) after a third time.

Optionally, in another implementation, when an association relationship switching command (for example, a MAC-CE message) of the network device is received, an antenna panel indicated by the switching command may be switched after waiting for a third time (a corresponding signal/channel is received or sent by using the antenna panel #b).

Optionally, after obtaining fourth time information, the terminal device keeps the indicated association relationship (in this example, keeps the antenna panel #b associated with the signal/channel) within a fourth time after the antenna panel is switched. After the fourth time, the antenna panel may be switched to the original antenna panel (antenna panel #a) or the default antenna panel.

It should be understood that "first", "second", "third", and "fourth" introduced in this embodiment of this application are merely to distinguish between different objects. For example, the "first time information", "second time information", "third time information", and "fourth time information" are merely used to distinguish between different time information, or the "first time", "second time", "third time", and "fourth time" are merely used to distinguish different time, and do not limit a time sequence.

This application further provides an embodiment. The network device may configure power control information for an antenna panel of the terminal device. It should be noted that this embodiment may be implemented separately, or may be implemented in combination with the foregoing embodiment (for example, the method 200) and/or the following embodiment. This is not limited.

In this embodiment of this application, the terminal device may further obtain information related to power control of an antenna panel. Optionally, the network device configures independent power control loops for the terminal device for different antenna panels. Correspondingly, the terminal device may not consider impact of antenna panel switching on the power control. After the terminal device receives a command for activating an antenna panel or a command for switching an antenna panel, a power control state of the current active antenna panel may be directly used for a newly activated antenna panel. Alternatively, optionally, the network device may group antenna panels of the terminal device, and configure different power control loops for different groups. Correspondingly, for antenna panels in a same group, the terminal device needs to maintain a common power control loop. To be specific, the antenna panels in the group share a common set of power control parameters and states. For different antenna panel groups, the terminal device may use different power control loops.

Optionally, the network device may configure an independent power control parameter for each antenna panel. Herein, a physical uplink shared channel PUSCH is used as an example. The network device may configure a parameter value in a PUSCH transmit power calculation formula by using RRC signaling and DCI. Configured uplink power control parameters may include a plurality of RRC information elements (IE): PUSCH-ConfigCommon, PUSCH-PowerControl, and the like. Configured power parameters may include an open-loop power parameter (for example, p0, p0-NominalWithGrant, and p0-NominalWithoutGrant), a closed-loop power parameter, and other power parameters (a path loss compensation parameter alpha, MCS-based power adjustment deltaMCS, a power accumulation form tpc-Accumulation, and the like). As shown in Table 2 and Table 3, several PUSCH-related power control parameters are listed.

TABLE 2

PUSCH-ConfigCommon RRC IE

| p0-NominalWithGrant | Cell-reference open-loop power transmission value |
|---|---|
| Alpha | Path loss compensation parameter |

TABLE 3

PUSCH-PowerControl RRC IE

| p0 | User open-loop power offset |
|---|---|
| deltaMCS | Whether to determine by using an MCS-based power adjustment |
| tpc-Accumulation | Whether to determine by using a TPC accumulation form |

The terminal device calculates a transmit power based on the uplink power control parameters configured by the network device, as shown in the following formula (1):

$$P_{PUSCH,b,f,c}(i, j, q_d, l) = \min\left\{\begin{array}{l}P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l)\end{array}\right\}. \quad (1)$$

The formula (1) is used to calculate a transmit power used by the terminal device to perform PUSCH transmission in a BWP b of a carrier f in a cell c.

$P_{CMAX,f,c}(i)$ in the formula (1) is a transmit power that is on a PUSCH transmission occasion i on the carrier f in the cell c and that is defined in standard protocols [TS 38.101-1: NR; User Equipment (UE) radio transmission and reception; Part 1: Range 1 Standalone] and [8-2, TS38.101-2: NR; User Equipment (UE) radio transmission and reception; Part 2: Range 2 Standalone]. In this embodiment of this application, $P_{CMAX,f,c}(i)$ may be related to an antenna panel, or related to a quantity of antenna panels simultaneously activated by the terminal device, or related to an antenna panel-related capability (for example, power borrowing between antenna panels, or an antenna panel transmit power) reported by the terminal device. For example, when powers of different antenna panels reported by the terminal device can be shared, $P_{CMAX,f,c}(i)$ may be related to one or more of the following factors: a quantity of antenna panels, a maximum transmit power corresponding to a single antenna panel, a set of activated antenna panels, and the like.

In the formula (1), $P_{O\_PUSCH,b,f,c}(j)$ is a sum of $P_{O\_NOMINAL\_PUSCH, f,c}(j)$ and $P_{O\_UE\_PUSCH,b, f,c}(j)$, where $P_{O\_NOMINAL\_PUSCH,f,c}(j)$ is a cell common power parameter p0-NominalPUSCH configured by using RRC, $P_{O\_UE\_PUSCH,b,f,c}(j)$ is a power offset of the UE, and $j \in \{0, 1, \ldots, J-1\}$.

In the formula (1), $\alpha_{b, f, c}(j)$ is an alpha value configured by using the RRC signaling in Table 2, and represents a path loss compensation parameter; $M_{RB,b,f,c}^{PUSCH}(i)$ is a bandwidth occupied by a PUSCH resource on the transmission occasion i, and is in a unit of RB; $PL_{b,f,c}(q_d)$ is a path loss (dB) obtained by the UE through calculation and measurement by using $RS^{q_d}$.

For $\Delta_{TF,b,f,c}(i)$ in the formula (1), when $K_S=1.25$, $\Delta_{TF,b,f,c}(i)=10\log_{10}((2^{BPRE \cdot K_S}-1) \cdot \beta_{offset}^{PUSCH})$; when $K_S=0$, $\Delta_{TF,b,f,c}(i)=0$. A meaning of $\Delta_{TF,b,f,c}(i)$ is to allow, based on a transmission format, a transmit power per RB to be adaptive to a transmission information data rate. $K_S$ is configured by using higher layer signaling deltaMCS. For details about calculation of BPR and $\beta_{offset}^{PUSCH}$, refer to TS 38.211 (NR; Physical channels and modulation).

$f_{b,f,c}(i,l)$ in the formula (1) is UE-specific closed-loop power control, and may be classified into an accumulated value and an absolute value, where the accumulated value is enabled by tpc-Accumulation. $K_{PUSCH}$ is a quantity of symbols after a last symbol of the PDCCH corresponding to DCI for power control in the uplink BWP b of the carrier f in the cell c and before the PUSCH transmission.

If the tpc-Accumulation is used to configure the power accumulation to be in an enabled state, and if a DCI format 2_2 of a CRC check bit scrambled by using the TPC-PUSCH-RNTI for M times is detected between two PUSCH occasions, an accumulated correction amount is a sum of an accumulation amount obtained for the M times and an accumulation amount on the previous PUSCH occasion:

$$\delta_{PUSCH,b,f,c}(i_{last}, i, K_{PUSCH}, l) = \delta_{PUSCH,b,f,c}(i_{last}, i, K_{PUSCH}, l) + \sum_{m=0}^{M-1} \delta_{PUSCH,b,f,c}(i_{last}, i, K_{PUSCH}(m), l) \text{ [dBm]},$$

where $f_{b,f,c}(i,l)$ is a PUSCH uplink power control adjustment state, and $f_{b,f,c}(i,l)=f_{b,f,c}(i_{last},l)+\delta_{PUSCH,b,f,c}(i_{last},i,K_{PUSCH},l)$.

If the tpc-Accumulation is used to configure the power accumulation to be in a disabled state, $f_{b,f,c}(i,l)=\delta_{PUSCH,b,f,c}(i_{last},i,K_{PUSCH},l)$, where $\delta_{PUSCH,b,f,c}(i_{last},i,K_{PUSCH},l)$ is a correction value, is also referred to as a TPC command, and is included in a DCI format 0_0 or a DCI format 0_1 of a scheduling PUSCH occasion i that is after a latest PUSCH occasion $i_{last}$ of the BWP b of the carrier c, or jointly encoded with another TPC command in a DCI format 2_2 for scrambling the CRC check bit by using the TPC-PUSCH-RNTI. $f_{b,f,c}(i,l)$ and $\delta_{PUSCH,b,f,c}(i_{last},i,K_{PUSCH},l)$ may be collectively referred to as a closed-loop power adjustment amount. According to whether an accumulation amount is in an enabled state, a mapping relationship between the TPC command (optionally, the TPC command may be two bits) and a corresponding power adjustment amount is shown in the following Table 4. The first column is the TPC command, and the second column is a power adjustment amount corresponding to the TPC command when power accumulation is in the enabled state. The third column is a power adjustment amount corresponding to the TPC command when power accumulation is in the disabled state.

TABLE 4

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

Optionally, when the terminal device receives first indication information (an antenna panel switching command, an antenna panel activation command, or an antenna panel deactivation command), the closed-loop power adjustment amount $f_{b,f,c}(i,l)$ and/or $\delta_{PUSCH,b,f,c}(i_{last},i,K_{PUSCH},l)$ are/is set to 0. When the terminal device changes an antenna panel state, if the terminal device maintains an accumulation amount of $\delta_{PUSCH,b,f,c}(i_{last},i,K_{PUSCH},l)$, the accumulation amount may be kept and used for a PUSCH after the antenna panel switching, or $\delta_{PUSCH,b,f,c}(i_{last},i,K_{PUSCH},l)$ may be reset to 0.

Optionally, in this embodiment of this application, a transmit power corresponding to each antenna panel may be calculated by using the following formula (2):

$$P_{PUSCH,b,f,c,n} = \min\left\{\begin{array}{l}P_{CMAX,f,c,n}(i),\\ P_{O\_PUSCH,b,f,c,n}(j) + 10\log_{10}(2^{\mu} \cdot M_{RB,b,f,c,n}^{PUSCH}(i)) + \\ \alpha_{b,f,c,n}(j) \cdot PL_{b,f,c,n}(q_d) + \Delta_{TF,b,f,c,n}(i) + f_{b,f,c,n}(i,l)\end{array}\right\}. \quad (2)$$

Compared with the formula (1) for calculating the transmit power, n is introduced in the formula (2), where n is an index identifier of an antenna panel. In other words, the antenna panel is considered when calculating the transmit power. In this embodiment of this application, the terminal device may maintain different closed-loop power adjustment amounts for different antenna panels, for example, $f_{b,f,c,n}(i,l)$ and/or $\delta_{PUSCH,b,f,c,n}(i_{last},i,K_{PUSCH},l)$. In this case, after switching the antenna panel, the terminal device needs to use a power control parameter corresponding to a switched antenna panel.

It should be noted that not all items in the formula (2) are related to n at the same time. For example, each antenna panel may maintain a power accumulation amount of the antenna panel, and another parameter is irrelevant to an antenna panel index. In a possible case, the antenna panel activation command received by the terminal device includes the power control parameter. In addition, the network device may notify the terminal device, by using configuration information or through protocol agreement, that antenna panel power control information is configured for all antenna panels, configured for some antenna panels, or independently configured for a single antenna panel. Alternatively, the network device may notify the terminal device that a currently activated antenna panel needs to use a power control state of another antenna panel. In addition, the antenna panel deactivation command received by the terminal device may further additionally indicate whether the terminal device clears or saves a power control parameter state of the current antenna panel.

Optionally, in an embodiment, the network device may configure an effective time of the power control parameter for the terminal device. Specifically, the network device may configure an effective time for each antenna panel or antenna panel group. In the effective time, a power control parameter configured by the network device for each antenna panel or antenna panel group is always valid (even if the antenna panel is deactivated from an active state) until the effective time expires. After the effective time expires, the power control parameter state may be cleared.

Optionally, in an embodiment, the network device may further configure an independent power control parameter for each beam of each antenna panel. Optionally, the independent power control parameter of each beam may be an offset value relative to a power control parameter of an antenna panel to which the beam belongs. When the terminal device sends a signal by using the beam, a transmit power of the terminal device is jointly determined by the power control parameter of the antenna panel and the power control parameter of the beam.

Optionally, the network device may notify the terminal of the power control parameter by using one or a combination of a broadcast channel, RRC signaling, MAC-CE signaling, and control signaling DCI.

Optionally, when the network device requires the terminal to simultaneously use a plurality of antenna panels, the network device notifies the terminal of power control parameters of the plurality of antenna panels by using one or a combination of a broadcast channel, RRC signaling, MAC-CE signaling, and control signaling DCI.

Optionally, when the network device requires the terminal to simultaneously use a plurality of beams of one antenna panel, the network device notifies the terminal of power control parameters of the plurality of beams of the antenna panel by using one or a combination of a broadcast channel, RRC signaling, MAC-CE signaling, and control signaling DCI.

Optionally, when the network device requires the terminal to simultaneously use a plurality of beams of a plurality of antenna panels, the network device notifies the terminal of power control parameters of the plurality of beams of the plurality of antenna panels by using one or a combination of a broadcast channel, RRC signaling, MAC-CE signaling, and control signaling DCI.

Optionally, the network device may notify the terminal of a TA offset value of an antenna panel by using MAC-CE signaling, and notify the terminal of a power control parameter of a beam relative to the antenna panel by using DCI.

This application further provides an embodiment. The network device may configure related timing advance information for an antenna panel of the terminal device. It should be noted that this embodiment may be implemented separately, or may be implemented in combination with the foregoing embodiment (for example, the method 200). This is not limited. Details are described below.

The network device sends timing advance information of an antenna panel to the terminal device. The timing advance information includes a timing advance TA, and the antenna panel is any one of the one or more antenna panels that need to be activated or deactivated and that are indicated by the network device.

Optionally, the timing advance information may also be carried in the foregoing first indication information.

Optionally, the timing advance information may be carried in other information such as a MAC-CE message, a random access response RAR, or DCI.

Specifically, the network device may separately configure a timing advance for each antenna panel of the terminal device. Alternatively, the network device may configure a same timing advance for one antenna panel group). Similarly, the network device may configure a timing advance for each uplink beam indicator (for example, an SRS or an SRS resource set) of the terminal device.

Optionally, the network device configures one or more timing advance antenna panel groups for the terminal device by using higher layer signaling. Each antenna panel group includes or is associated with one or more antenna panels, and corresponds to one antenna panel group ID (PG-ID). The terminal device maintains one TA amount for each antenna panel group.

Alternatively, optionally, the network device associates the antenna panel or the antenna panel group with one timing advance group (TAG), and the terminal device maintains one TA amount for each TAG.

Alternatively, optionally, the network device associates the antenna panel or the antenna panel group with a plurality of TAGs, and the terminal device maintains one TA amount for each TAG. For different TAGs, a same antenna panel may have different TA amounts.

It should be understood that descriptions are provided herein uniformly. The TA amount in this embodiment of this application may be $N_{TA}$, or may be an absolute TA value. This is not limited in this embodiment of this application.

Optionally, the timing advance information may further include one or more of the following information: an antenna panel group ID, an antenna panel ID a TAG ID, or timing advance adjustment information. The timing advance adjustment information may be timing advance adjustment information for one antenna panel or antenna panel group, or may be timing advance adjustment information for one or more antenna panels associated with one or more TAGs, or timing advance adjustment information of one or more TAGs associated with one or more antenna panels.

Optionally, each antenna panel or antenna panel group may have a TA upper limit or a TA lower limit that needs to be met. Optionally, a value of the TA upper limit or the TA lower limit may be agreed on in a protocol, or may be configured by the network device.

Optionally, a difference between TA amounts of different antenna panels or antenna panel groups associated with a same TAG, or of different TAGs associated with a same antenna panel or antenna panel group may need to meet a TA upper limit or a TA lower limit. Optionally, a value of the TA upper limit or the TA lower limit herein may be agreed on in a protocol, or may be configured by the network device.

Optionally, the network device may deliver timing advance adjustment information of a plurality of TAGs or antenna panels by using one piece of signaling (for example, a MAC-CE message or DCI). For example, the MAC-CE message is used as an example. The MAC-CE includes a TAG-ID, and may further include several groups of bit values. Each group of bit values corresponds to a timing advance adjustment amount of an antenna panel that is in a TAG corresponding to the TAG-ID. Alternatively, the MAC-CE includes an antenna panel group ID, and may further include several groups of bit values, and each group of bit values corresponds to a timing advance adjustment amount of a TAG associated with the antenna panel group.

Optionally, the timing advance adjustment information carries a timing advance adjustment amount. Correspondingly, after receiving the timing advance adjustment information in an $n^{th}$ slot, the terminal device needs to use the timing advance adjustment amount in an $(n+T_{apply})^{th}$ slot. $T_{apply}$ may be configured by the network device by using control information, or may be calculated in a manner agreed on in a protocol. The timing advance adjustment amount in this embodiment of this application may be an absolute adjustment amount. In other words, the terminal device may directly replace an existing timing advance with the absolute adjustment amount. Alternatively, the timing advance adjustment amount may be a relative adjustment amount. In other words, the relative adjustment amount represents that, on a basis of an existing timing advance, the terminal device increases or decreases the relative adjustment amount. Optionally, the timing advance adjustment amount in this embodiment of this application may be quantized, and quantization resolution may be related to a subcarrier spacing.

Optionally, compared with a calculation manner in the conventional technology, the timing advance in this embodiment of this application may be increased by a timing advance parameter $T_{offset, antenna\ panel}$. The timing advance parameter may be configured by the network device or agreed on in a protocol, and may be related to whether to switch an antenna panel or antenna panel group during uplink and downlink sending. Alternatively, the timing advance parameter may be determined by an enabling status of the antenna panel or antenna panel group. Specifically, the timing advance in this embodiment of this application may be calculated by using the following formula (3):

$$T_{TA} = (N_{TA} + N_{TA,offset} + T_{offset,panel})T_c \qquad (3), \text{where}$$

$N_{TA}$ is a quantized timing advance parameter, and a timing advance of an uplink subframe that corresponds to $N_{TA}$ and that is relative to a synchronized downlink subframe i may be calculated through $N_{TA} \cdot T_c = 1/(\Delta f_{max} \cdot N_f)$, $\Delta f_{max} = 480 \cdot 10^3$ Hz, and $N_f = 4096$. $N_{TA,offset}$ is related to a frequency band, or may be specified by using higher layer signaling. A value of $N_{TA,offset}$ may be shown in the following Table 5:

TABLE 5

| Frequency band used for uplink transmission in a cell | $N_{TAoffset}$(Unit: Tc) |
|---|---|
| FDD in FR1 | 0 |
| FR1 TDD band | 39936 or 25600 (Note 1) |
| FR2 | 13792 |

(Note 1):
The UE identifies $N_{TAoffset}$ based on the information [TBD] according to [TS38.331]. (The UE determines $N_{TA\ offset}$ based on the information [TBD] according to 38.331)
NOTE 2:
The value of $N_{TAoffset}$ that applies to the supplementary UL carrier is determined from the non-supplementary UL carrier. (The value of $N_{TA\ offset}$ that applies to the supplementary UL carrier is determined from the non-supplementary UL carrier)

For concepts or meanings used in Table 5, refer to descriptions in the existing standard protocol TS 38.133 (NR; Requirements for support of radio resource management). For brevity, details are not described herein.

Optionally, if one antenna panel group includes a plurality of antenna panels, to implement more accurate TA control, a two-level TA method may be introduced. A TA or TA offset at a reference antenna panel group level is first configured, and on this basis, a TA or TA offset relative to the antenna panel group is configured for each antenna panel. Specifically, the timing advance in this embodiment of this application may be calculated by using the following formula (4):

$$T_{TA,panel} = (N_{TA} + N_{TA,offset} + T_{offset,panelgroup} + T_{offset,panel}) T_c \quad (4)$$

In the formula (4), $T_{TA,panel}$ is a TA that needs to be used for each antenna panel, and $T_{offset,panelgroup}$ is a TA offset value of each antenna panel group relative to a reference value (that is, NTA+NTA,offset). $T_{offset,panel}$ is a TA offset value of each antenna panel relative to the antenna panel group. If there is no antenna panel group, the formula (4) is simplified into a formula (5):

$$T_{TA,panel} = (N_{TA} + N_{TA,offset} + T_{offset,panel}) T_c \quad (5)$$

If there is one antenna panel in the antenna panel group, the formula (4) is simplified into a formula (6):

$$T_{TA,panel} = (N_{TA} + N_{TA,offset} + T_{offset,panelgroup}) T_c \quad (6)$$

Optionally, if one antenna panel can be used to send one or more possible beams, to implement more accurate TA control, a beam-level TA or TA offset may be further introduced. A TA offset of each beam is a TA value relative to an antenna panel in which the beam is located. Specifically, the timing advance in this embodiment of this application may be calculated by using the following formula (7):

$$T_{TA,beam} = (N_{TA} + N_{TA,offset} + T_{offset,panel} + T_{offset,beam}) T_c \quad (7), \text{ where}$$

$T_{TA,beam}$ is a TA that needs to be used for each beam, and $T_{offset,beam}$ is a TA offset value of each beam relative to the antenna panel.

Optionally, if there are both an antenna panel group and an antenna panel, the formula (7) may be changed to a formula (8):

$$T_{TA,beam} = (N_{TA} + N_{TA,offset} + T_{offset,panelgroup} + T_{offset,panel} + T_{offset,beam}) T_c \quad (8)$$

Optionally, the TA offset values in the foregoing formulas may all be predefined or notified by the network device to the terminal, and the TA offset value includes at least one of the following: a TA offset value of each antenna panel group relative to the reference value (that is, $N_{TA} + N_{TA,offset}$), a TA offset value of each antenna panel relative to the reference value (that is, $N_{TA} + N_{TA,offset}$), a TA offset value of each antenna panel relative to an antenna panel group in which the antenna panel is located, a TA offset value of each beam relative to an antenna panel in which the beam is located, and a TA offset value of each beam relative to the reference value (that is, $N_{TA} + N_{TA,offset}$).

Optionally, the network device may notify the terminal of the TA offset value by using one or a combination of a broadcast channel, RRC signaling, MAC-CE signaling, and control signaling DCI.

Optionally, when the network device requires the terminal to simultaneously use a plurality of antenna panels, the network device notifies the terminal of TA offset values of the plurality of antenna panels by using one or a combination of a broadcast channel, RRC signaling, MAC-CE signaling, and control signaling DCI.

Optionally, when the network device requires the terminal to simultaneously use a plurality of beams of one antenna panel, the network device notifies the terminal of TA offset values of the plurality of beams of the antenna panel by using one or a combination of a broadcast channel, RRC signaling, MAC-CE signaling, and control signaling DCI.

Optionally, when the network device requires the terminal to simultaneously use a plurality of beams of a plurality of antenna panels, the network device notifies the terminal of TA offset values of the plurality of beams of the plurality of antenna panels by using one or a combination of a broadcast channel, RRC signaling, MAC-CE signaling, and control signaling DCI.

Optionally, the network device may notify the terminal of a TA offset value of the antenna panel by using MAC-CE signaling, and notify the terminal of a TA offset value of the beam relative to the antenna panel by using DCI.

It should be understood that the solutions in the embodiments of this application may be properly combined for use, and explanations or descriptions of terms in the embodiments may be cross-referenced or explained in the embodiments. This is not limited.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the method for managing an antenna panel according to the embodiments of this application with reference to FIG. 1 and FIG. 2. The following describes an apparatus for managing an antenna panel according to the embodiments of this application with reference to FIG. 3 to FIG. 6. It should be understood that the technical features described in the method embodiments are also applicable to the following apparatus embodiments.

Figure 3:
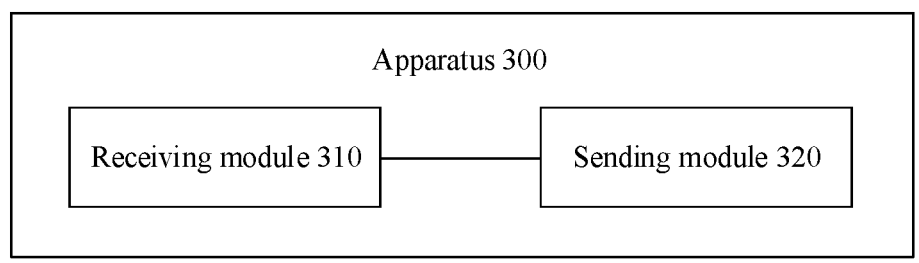
FIG. 3 is a schematic block diagram of an apparatus for managing an antenna panel according to an embodiment of this application.

FIG. 3 is a schematic block diagram of an apparatus 300 for managing an antenna panel according to an embodiment of this application. Optionally, a specific form of the apparatus 300 may be a network device or a chip in a network device. This is not limited in this embodiment of this application. The apparatus 300 includes:

a receiving module 310, configured to receive capability information that is of an antenna panel that is from a terminal device; and a sending module 320, configured to send first indication information to the terminal device, where the first indication information is used to indicate the terminal device to activate and/or deactivate one or more antenna panels.

Optionally, if the first indication information is used to indicate the terminal device to activate one or more first antenna panels, the first indication information carries information required for activating the one or more first antenna panels; and/or if the first indication information is used to indicate the terminal device to deactivate one or more second antenna panels, the first indication information includes information required for deactivating the one or more second antenna panels.

In a possible implementation, the sending module 320 is further configured to send first resource configuration information to the terminal device, where the first resource configuration information is used to configure one or more reference signal resource sets, and each reference signal resource set is associated with one antenna panel.

In a possible implementation, if the first indication information is used to indicate the terminal device to activate the one or more first antenna panels, the sending module 320 is further configured to send first time information to the terminal device, where the first time information is used to indicate that the terminal device is to keep the one or more first antenna panels in an active state after a first time ends.

Optionally, if the first indication information is used to indicate the terminal device to activate the one or more first antenna panels, the sending module 320 is further configured to indicate, to the terminal device, duration for keeping the one or more first antenna panels activated.

In a possible implementation, if the first indication information is used to indicate the terminal device to deactivate the one or more second antenna panels, the sending module 320 is further configured to send second time information to the terminal device, where the second time information is used to indicate that the terminal device deactivates the one or more second antenna panels after a second time.

Optionally, if the first indication information is used to indicate the terminal device to deactivate the one or more second antenna panels, the sending module 320 is further configured to indicate, to the terminal device, duration for keeping the one or more second antenna panels deactivated.

In a possible implementation, the sending module 320 is further configured to send power control configuration of each of the one or more antenna panels to the terminal device.

In a possible implementation, the sending module 320 is further configured to send timing advance information of an antenna panel to the terminal device, where the timing advance information includes a timing advance, and the antenna panel is any one of the one or more antenna panels that need to be activated or deactivated and that are indicated by the network device.

Optionally, the timing advance information further includes timing advance adjustment information, and the timing advance adjustment information is used to indicate the terminal device to adjust the timing advance used for any antenna panel.

It should be understood that the apparatus 300 for managing an antenna panel according to this embodiment of this application may correspond to the method of the network device in the foregoing method embodiments, for example, the method in FIG. 2. The foregoing and other management operations and/or functions of the modules in the apparatus 300 are respectively used to implement corresponding steps of the method of the network device in the foregoing method embodiments. Therefore, beneficial effects in the foregoing method embodiments may also be implemented. For brevity, details are not described herein.

It should be further understood that the modules in the apparatus 300 may be implemented in a form of software and/or hardware. This is not specifically limited. In other words, the apparatus 300 is presented in a form of a function module. The "module" herein may be an application-specific integrated circuit ASIC, a circuit, a processor and a memory that execute one or more software or firmware programs, an integrated logic circuit, and/or another component that can provide the foregoing functions.

Figure 4:
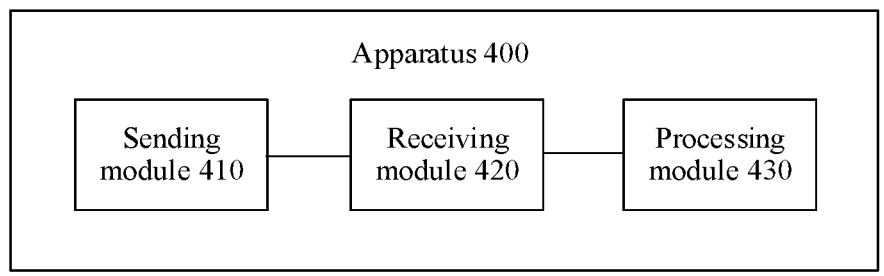
FIG. 4 is a schematic block diagram of an apparatus for managing an antenna panel according to another embodiment of this application.

FIG. 4 is a schematic block diagram of an apparatus 400 for managing an antenna panel according to an embodiment of this application. Optionally, a specific form of the apparatus 400 may be a terminal device or a chip in a terminal device. This is not limited in this embodiment of this application. The apparatus 400 includes:

a sending module 410, configured to send capability information to a network device;

a receiving module 420, configured to receive first indication information that is from the network device, where the first indication information is used to indicate the terminal device to activate and/or deactivate one or more antenna panels; and a processing module 430, configured to: activate and/or deactivate the one or more antenna panels.

Optionally, the processing module 430 is specifically configured to: if the first indication information is used to indicate the terminal device to activate one or more first antenna panels, and the first indication information carries information required for activating the one or more first antenna panels, activate the one or more first antenna panels; and/or if the first indication information is used to indicate the terminal device to deactivate one or more second antenna panels, and the first indication information includes information required for deactivating the one or more second antenna panels, deactivate the one or more second antenna panels.

In a possible implementation, the receiving module 420 is further configured to:

receive first resource configuration information that is from the network device, where the first resource configuration information is used to configure one or more reference signal resource sets, and each reference signal resource set is associated with one antenna panel.

In a possible implementation, if the first indication information is used to indicate the terminal device to activate the one or more first antenna panels, the receiving module 420 is further configured to:

obtain first time information, where the first time information is used to indicate that the terminal device is to keep the one or more first antenna panels in an active state after a first time ends.

The processing module 430 is configured to keep the one or more first antenna panels in the active state after the first time ends.

Optionally, if the first indication information is used to indicate the terminal device to activate the one or more first antenna panels, the receiving module 420 is further configured to obtain duration for keeping the one or more first antenna panels activated.

The processing module 430 is configured to keep the active state of the one or more first antenna panels within the duration.

In a possible implementation, if the first indication information is used to indicate the terminal device to deactivate the one or more second antenna panels, the receiving module 420 is further configured to obtain second time information, where the second time information is used to indicate that the terminal device deactivates the one or more first antenna panels after a second time.

The processing module 430 is configured to perform a deactivation operation on the one or more second antenna panels after the second time.

Optionally, if the first indication information is used to indicate the terminal device to deactivate the one or more second antenna panels, the receiving module 420 is further configured to obtain duration for keeping the one or more second antenna panels deactivated.

The processing module 430 is configured to: when deactivating the one or more second antenna panels, keep an inactive state of the one or more second antenna panels within the duration.

In a possible implementation, the receiving module 420 is further configured to receive power control configuration that is of each of the one or more antenna panels and that is from the network device.

In a possible implementation, the processing module 430 is further configured to: when calculating a transmit power of an antenna panel, perform a zero-out operation on a closed-loop power adjustment amount corresponding to the antenna panel, where the antenna panel is any one of the one or more antenna panels that need to be activated or deactivated and that are indicated by the network device.

In a possible implementation, the receiving module 420 is further configured to receive timing advance information that is of an antenna panel and that is from the network device, where the timing advance information includes a timing advance, and the antenna panel is any one of the one or more antenna panels that need to be activated or deactivated and that are indicated by the network device.

Optionally, the timing advance information further includes timing advance adjustment information, and the timing advance adjustment information is used to indicate the terminal device to adjust the timing advance used for any antenna panel.

It should be understood that the apparatus 400 for managing an antenna panel according to this embodiment of this application may correspond to the method of the terminal device in the foregoing method embodiments, for example, the method in FIG. 2. The foregoing and other management operations and/or functions of the modules in the apparatus 400 are respectively used to implement corresponding steps of the method of the terminal device in the foregoing method embodiments. Therefore, beneficial effects in the foregoing method embodiments may also be implemented. For brevity, details are not described herein.

It should be further understood that the modules in the apparatus 400 may be implemented in a form of software and/or hardware. This is not specifically limited. In other words, the apparatus 400 is presented in a form of a function module. The "module" herein may be an application-specific integrated circuit ASIC, a circuit, a processor and a memory that execute one or more software or firmware programs, an integrated logic circuit, and/or another component that can provide the foregoing functions.

An embodiment of this application further provides a first communications apparatus. The first communications apparatus may be a terminal device or a chip. The first communications apparatus may be configured to perform an action performed by the terminal device in the foregoing method embodiments.

Figure 5:
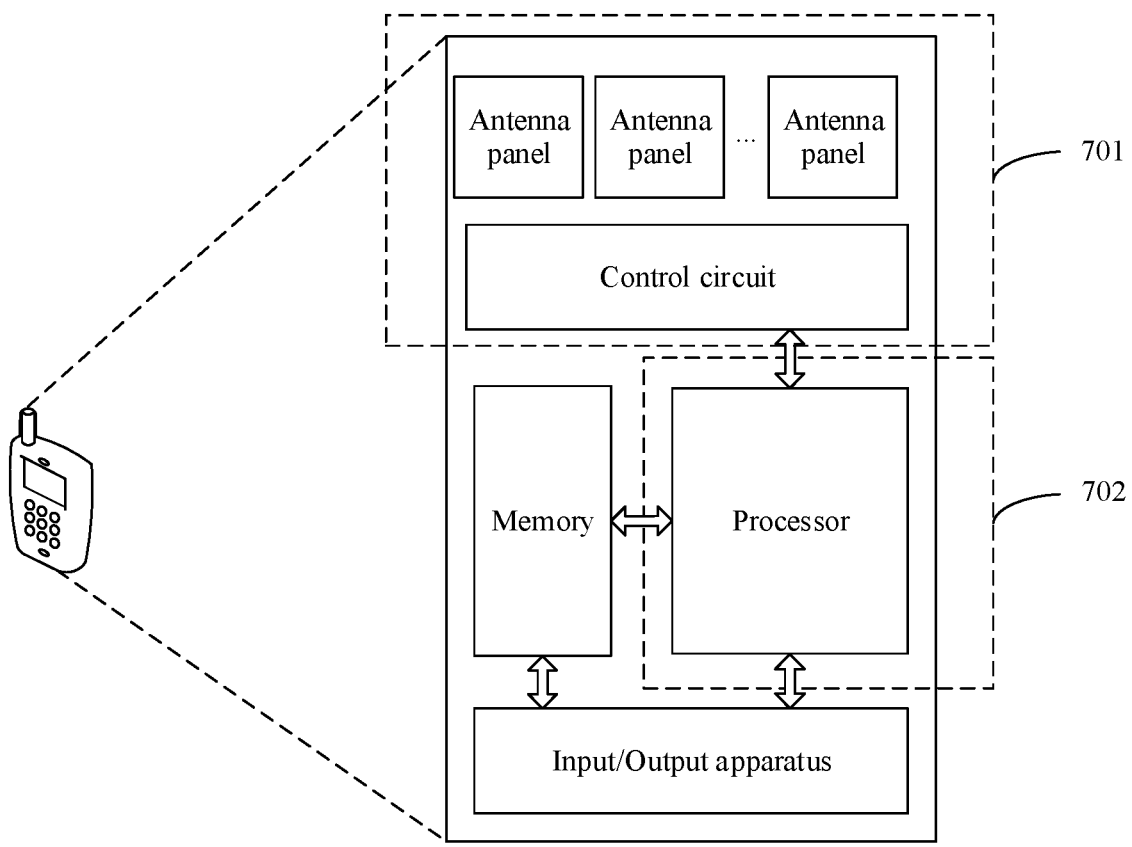
FIG. 5 is a schematic structural block diagram of an apparatus for managing an antenna panel according to an embodiment of this application.

When the first communications apparatus is a terminal device, FIG. 5 is a simplified schematic structural diagram of the terminal device. For ease of understanding and convenience of figure illustration, an example in which the terminal device is a mobile phone is used in FIG. 5. As shown in FIG. 5, the terminal device includes a processor, a memory, a radio frequency circuit, a plurality of antenna panels, and an input/output apparatus. The processor is mainly configured to: process a communications protocol and communication data, control the terminal device, execute a software program, process data of the software program, and the like. The memory is mainly configured to store a software program and data. The radio frequency circuit is mainly configured to: convert a baseband signal and a radio frequency signal, and process the radio frequency signal. The plurality of antenna panels are mainly configured to receive and send a radio frequency signal in an electromagnetic wave form. The input/output apparatus, such as a touchscreen, a display screen, or a keyboard, is mainly configured to receive data input by a user and output data to the user. It should be noted that some types of terminal devices may have no input/output apparatus.

When data needs to be sent, the processor performs baseband processing on the to-be-sent data, and outputs a baseband signal to the radio frequency circuit. After performing radio frequency processing on the baseband signal, the radio frequency circuit sends a radio frequency signal in an electromagnetic wave form through an antenna element on the antenna panel. When data is sent to the terminal device, the radio frequency circuit receives a radio frequency signal through the antenna element on the antenna panel, converts the radio frequency signal into a baseband signal, and outputs the baseband signal to the processor. The processor converts the baseband signal into data, and processes the data. For ease of description, FIG. 5 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna panel and the radio frequency circuit that have receiving and sending functions may be considered as a transceiver unit of the terminal device, and the processor that has a processing function may be considered as a processing unit of the terminal device. As shown in FIG. 5, the terminal device includes a transceiver unit 701 and a processing unit 702. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the receiving unit and the sending unit. The transceiver unit may also be sometimes referred to as a transceiver machine, a transceiver, a transceiver circuit, or the like. The receiving unit may also be sometimes referred to as a receiving machine, a receiver, a receiver circuit, or the like. The sending unit may also be sometimes referred to as a transmitting machine, a transmitter, a transmitter circuit, or the like.

For example, in an implementation, the transceiver unit 701 is configured to perform a receiving operation on a terminal device side in step 220 or a sending operation on a terminal device side in step 210 in FIG. 2, and/or the transceiver unit 701 is further configured to perform other receiving and sending steps on the terminal device side in the embodiments of this application. The processing unit 702 is configured to perform an activation operation and/or a deactivation operation on the terminal device side in step 230 in FIG. 2, and/or the processing unit 702 is further configured to perform a sending operation on the terminal device side and other processing steps on the terminal device side in the embodiments of this application.

When the first communications apparatus is a chip, the chip includes a transceiver unit and a processing unit. The transceiver unit may be an input/output circuit or a communications interface. The processing unit is a processor, a microprocessor, or an integrated circuit integrated on the chip.

An embodiment of this application further provides a second communications apparatus. The second communications apparatus may be a network device or a chip. The second communications apparatus may be configured to perform an action performed by the network device in the foregoing method embodiments.

Figure 6:
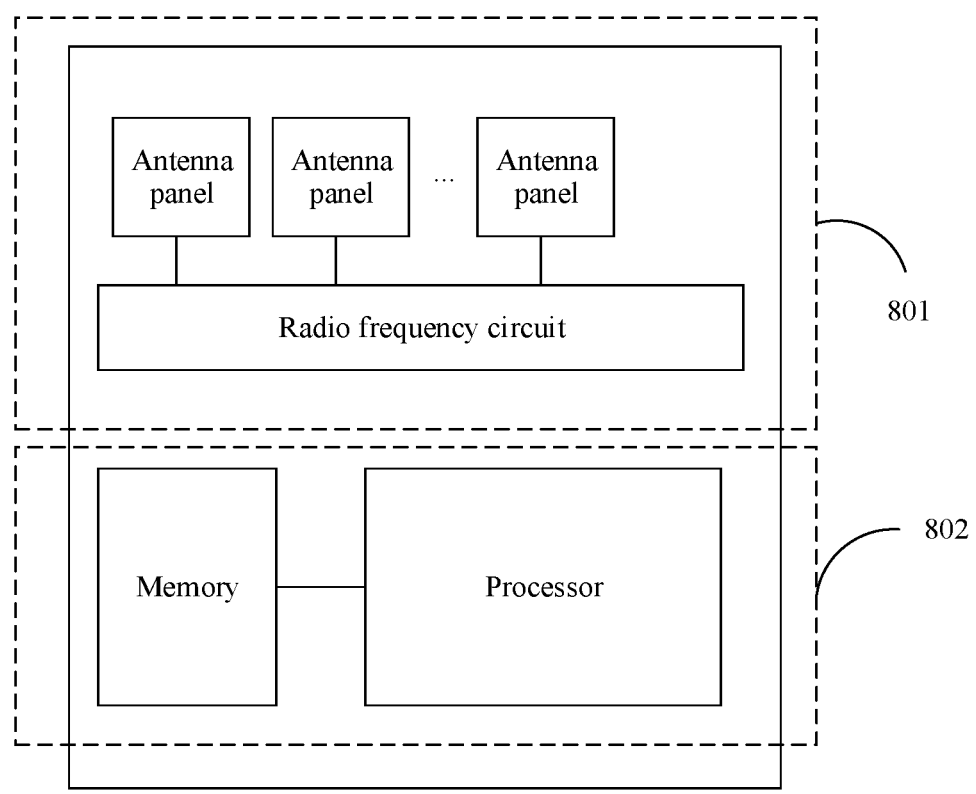
FIG. 6 is a schematic structural block diagram of an apparatus for managing an antenna panel according to another embodiment of this application.

When the second communications apparatus is a network device, specifically, for example, a base station, FIG. 6 is a simplified schematic structural diagram of the base station. The base station includes a part 801 and a part 802. The part 801 is mainly configured to: receive and send a radio frequency signal, and perform conversion between a radio frequency signal and a baseband signal. The part 802 is mainly configured to: perform baseband processing, control the base station, and the like. The part 801 may usually be referred to as a transceiver unit, a transceiver machine, a transceiver circuit, a transceiver, or the like. The part 802 is usually a control center of the base station, may be usually referred to as a processing unit, and is configured to control the base station to perform the action of generating the first indication information by the network device in the foregoing method embodiments. For details, refer to the foregoing descriptions of the related parts.

The transceiver unit in the part 801 may also be referred to as a transceiver machine, a transceiver, or the like. The transceiver unit includes a plurality of antenna panels and a radio frequency unit. The radio frequency unit is mainly configured to perform radio frequency processing. Optionally, a component that is in the part 801 and that is configured to implement a receiving function may be considered as a receiving unit, and a component that is configured to implement a sending function may be considered as a sending unit. In other words, the part 801 includes the receiving unit and the sending unit. The receiving unit may also be referred to as a receiver machine, a receiver, a receiver circuit, or the like. The sending unit may be referred to as a transmitter machine, a transmitter, a transmitter circuit, or the like.

The part 802 may include one or more boards. Each board may include one or more processors and one or more memories. The processor is configured to read and execute a program in the memory, to implement a baseband processing function and control the base station. If there are a plurality of boards, the boards may be interconnected to enhance a processing capability. In an optional implementation, a plurality of boards may share one or more processors, or a plurality of boards share one or more memories, or a plurality of boards share one or more processors at the same time.

For example, in an implementation, the transceiver unit is configured to perform a sending operation on a network device side in step 220 in FIG. 2 and a receiving action on the network device side in step 210 in FIG. 2, and/or the transceiver unit is further configured to perform other receiving and sending steps on the network device side in the embodiments of this application. The processing unit is configured to perform another processing step on the network device side in the embodiments of this application.

When the second communications apparatus is a chip, the chip includes a transceiver unit and a processing unit. The transceiver unit may be an input/output circuit or a communications interface. The processing unit is a processor, a microprocessor, or an integrated circuit integrated on the chip.

For explanations and beneficial effects of related content in any one of the foregoing provided communications apparatuses, refer to the corresponding method embodiments provided above. Details are not described herein again.

The method disclosed in the embodiments of this application may be applied to a processor or may be implemented by a processor. The processor may be an integrated circuit chip and has a signal processing capability. In an implementation process, steps in the foregoing method embodiments may be implemented by using a hardware integrated logic circuit in the processor or an instruction in a form of software. The processor may be a general purpose processor, a digital signal processor (DSP), an application-specific integrated circuit (ASIC), a field programmable gate array (FPGA) or another programmable logic device, a discrete gate, a transistor logic device, a discrete hardware component, a system on chip (SoC), a central processing unit (CPU), a network processor (NP), a digital signal processor (DSP), a micro controller unit (MCU), a programmable logic device (PLD), or another integrated chip. The methods, steps, and logic block diagrams that are disclosed in the embodiments of this application may be implemented or performed. The general purpose processor may be a microprocessor, or the processor may be any conventional processor or the like. The steps of the methods disclosed with reference to the embodiments of this application may be directly executed and completed by using a hardware decoding processor, or may be executed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (double data rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM).

It should be noted that when the processor is a general purpose processor, a DSP, an ASIC, an FPGA or another programmable logic device, a discrete gate or a transistor logic device, or a discrete hardware component, the memory (a storage module) is integrated into the processor.

It should be noted that the memory described in this specification aims to include but is not limited to these memories and any memory of another proper type.

In another form of this embodiment, a computer-readable storage medium is provided. The compute-readable storage medium stores an instruction. When the instruction is executed, the method on the terminal device side in the foregoing method embodiments is performed.

In another form of this embodiment, a computer program product that includes an instruction is provided. When the instruction is executed, the method on the terminal device side in the foregoing method embodiments is performed.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for managing a plurality of antenna panels of a terminal device, the method comprising:
   receiving, by a network device, from the terminal device, information describing a capability of each of the antenna panels of the terminal device,
       wherein each antenna panel comprises a plurality of antenna elements, and
       wherein each antenna element is capable of sending a radio frequency signal; and
   sending, by the network device, information to the terminal device, instructing the terminal device to activate or deactivate each of one or more of the plurality of antenna panels based on the information describing the capability of each of the antenna panels provided by the terminal device,
       wherein the information instructing the terminal device to activate or deactivate each of the one or more of the plurality of antenna panels includes information indicating to the terminal device to keep at least one of the one or more of the plurality of antenna panels in an active state after expiration of a time period.

2. The method according to claim 1, wherein the information instructing the terminal device to activate or deactivate one or more of the plurality of antenna panels includes information instructing the terminal device to activate at least one of the one or more of the plurality of antenna panels and information instructing the terminal device to deactivate at least one of the one or more of the plurality of antenna panels.

3. The method according to claim 1, further comprising:
sending, by the network device, resource configuration information to the terminal device, wherein the resource configuration information is used to configure one or more reference signal resource sets, and each reference signal resource set is associated with one antenna panel.

4. The method according to claim 1, wherein in response to the information instructing the terminal device to activate each of the one or more of the plurality of antenna panels, the method further comprises:
indicating, by the network device to the terminal device, a duration for keeping the at least one of the one or more of the plurality of antenna panels activated after expiration of the time period.

5. The method according to claim 2, wherein the time period is a first time period, and wherein in response to the information instructing the terminal device to deactivate the at least one of the one or more of the plurality of antenna panels, the method further comprises:
sending, by the network device, time information to the terminal device, wherein the time information instructs the terminal device to deactivate the at least one of the one or more second antenna panels after a second time period.

6. The method according to claim 2, wherein in response to the information instructing the terminal device to deactivate the at least one of the one or more of the plurality of antenna panels, the method further comprises:
indicating, by the network device to the terminal device, a duration for keeping the at least one of the one or more of the plurality of antenna panels deactivated.

7. A method for managing a plurality of antenna panels of a terminal device, the method comprising:
sending, by the terminal device, information to a network device describing a capability of each of the antenna panels of the terminal device,
wherein each antenna panel comprises a plurality of antenna elements, and
wherein each antenna element is capable of sending a radio frequency signal;
receiving, by the terminal device, information from the network device instructing the terminal device to activate or deactivate each of one or more of the plurality of antenna panels based on the information describing the capability of each of the one or more antenna panels provided by the terminal device,
wherein the information instructing the terminal device to activate or deactivate each of the one or more of the plurality of antenna panels includes information indicating to the terminal device to keep at least one of the one or more of the plurality of antenna panels in an active state after expiration of a time period; and
activating or deactivating, by the terminal device each of the one or more of the plurality of antenna panels based on the information instructing the terminal device to activate or deactivate each of the one or more of the plurality of antenna panels, including keeping the at least one of the one or more of the plurality of antenna panels activated after the time period.

8. The method according to claim 7, wherein the information instructing the terminal device to activate or deactivate each of the one or more of the plurality of antenna panels includes information instructing the terminal device to activate at least one of the one or more of the plurality of antenna panels and deactivate at least another one of the one or more of the plurality of antenna panels.

9. The method according to claim 7, further comprising:
receiving, by the terminal device, resource configuration information from the network device, wherein the resource configuration information is used to configure one or more reference signal resource sets, and each reference signal resource set is associated with one antenna panel.

10. The method according to claim 7, wherein in response to the information instructing the terminal device to activate at least one of the one or more of the plurality of antenna panels, the method further comprises:
obtaining, by the terminal device, a duration for keeping the at least one of the one or more of the plurality of antenna panels activated; and
keeping, by the terminal device, the active state of the at least one of the one or more of the plurality of antenna panels within the duration.

11. The method according to claim 7, wherein the time period is a first time period, and wherein in response to the information instructing the terminal device to deactivate at least one of the one or more of the plurality of antenna panels, the method further comprises:
obtaining, by the terminal device, information instructing the terminal device to deactivate the at least one of the one or more of the plurality of antenna panels after a second time period; and
performing, by the terminal device, a deactivation operation on the at least one of the one or more of the plurality of antenna panels after the second time period.

12. The method according to claim 7, wherein in response to the information instructing the terminal device to deactivate the at least one of the one or more of the plurality of antenna panels, the method further comprises:
obtaining, by the terminal device, a duration for keeping the at least one of the one or more of the plurality of antenna panels deactivated; and
during a performance of deactivating the at least one of the one or more of the plurality of antenna panels, keeping, by the terminal device, an inactive state of the at least one of the one or more of the plurality of antenna panels within the duration.

13. A terminal device comprising:
a transmitter configured to cooperate with a processor to send information to a network device describing a capability of each of the antenna panels of the terminal device,
wherein each antenna panel comprises a plurality of antenna elements, and
wherein each antenna element is capable of sending a radio frequency signal;
a receiver configured to cooperate with the processor to receive information from the network device instructing the terminal device to activate or deactivate each of one or more of the plurality of antenna panels based on the information describing the capability of each of the one or more antenna panels provided by the terminal device,
wherein the information instructing the terminal device to activate or deactivate each of the one or more of the plurality of antenna panels includes information indicating to the terminal device to keep at least one of the one or more of the plurality of antenna panels in an active state after expiration of a time period; and the processor configured to activate or deactivate each of the one or more of the plurality of antenna panels based on the information instructing the terminal device to activate or deactivate each of the one or more of the plurality of antenna panels, including keeping the at least one of the one or more of the plurality of antenna panels activated after the time period.

14. The terminal device according to claim 13, wherein the processor is configured to:

upon the information indicating the terminal device activate or deactivate each of the one or more of the plurality of antenna panels includes information instructing the terminal device to activate at least one of the one or more of the plurality of antenna panels and deactivate at least another one of the one or more of the plurality of antenna panels.

15. The terminal device according to claim 13, wherein the receiver is further configured to cooperate with the processor to:

receive resource configuration information from the network device, wherein the resource configuration information is used to configure one or more reference signal resource sets, and each reference signal resource set is associated with one antenna panel.

16. The terminal device according to claim 13, wherein in response to the information instructing the terminal device to activate at least one of the one or more of the plurality of antenna panels, the receiver is further configured to cooperate with the processor to obtain a duration for keeping the at least one of the one or more of the plurality of antenna panels activated; and the processor is configured to keep the active state of the at least one of the one or more of the plurality of antenna panels within the duration.

17. The terminal device according to claim 13, wherein the time period is a first time period, and wherein in response to the information instructing the terminal device to deactivate the at least one of the one or more of the plurality of antenna panels, the receiver is further configured to cooperate with the processor to obtain information indicating that the terminal device deactivate the at least one of the one or more of the plurality of antenna panels after a second time period; and the processor is configured to perform a deactivation operation on the at least one of the one or more of the plurality of antenna panels after the second time period.

18. A system including terminal and network devices, the system comprising:

the terminal device comprising a processor and a non-transitory computer readable medium storing executable instructions that, when executed by the processor, configure the processor to provide the following operations:

sending information to a network device describing a capability of each of the antenna panels of the terminal device,
wherein each antenna panel comprises a plurality of antenna elements, and
wherein each antenna element is capable of sending a radio frequency signal;

receiving information from the network device instructing the terminal device to activate or deactivate each of one or more of the plurality of antenna panels based on the information describing the capability of each of the one or more antenna panels provided by the terminal device,
wherein the information instructing the terminal device to activate or deactivate each of the one or more of the plurality of antenna panels includes information indicating to the terminal to keep at least one of the one or more of the plurality of antenna panels in an active state after expiration of a time period; and activating or deactivating, by the terminal device, each of the one or more of the plurality of antenna panels based on the information instructing the terminal device to activate or deactivate each of the one or more of the plurality of antenna panels, including keeping the at least one of the one or more of the plurality of antenna panels activated after the time period, the network device comprising a processor and a non-transitory computer readable medium storing executable instructions that, when executed by the processor, configure the processor to provide the following operations:

receiving from the terminal device, information describing a capability of each of the antenna panels of the terminal device; and sending information to the terminal device instructing the terminal device to activate or deactivate each of one or more of the plurality of antenna panels based on the information describing the capability of each of the antenna panels provided by the terminal.

19. The system according to claim 18, wherein the information instructing the terminal device to activate or deactivate one or more of the plurality of antenna panels includes information instructing the terminal device to activate at least one of the one or more of the plurality of antenna panels and information instructing the terminal device to deactivate at least one of the one or more of the plurality of antenna panels.

20. The system according to claim 18, wherein the processor of the terminal device is further configured to receive resource configuration information from the network device, wherein the resource configuration information is used to configure one or more reference signal resource sets, and each reference signal resource set is associated with one antenna panel.

* * * * *

UNITED STATES PATENT AND TRADEMARK OFFICE
CERTIFICATE OF CORRECTION

PATENT NO. : 11,463,953 B2
APPLICATION NO. : 17/172938
DATED : October 4, 2022
INVENTOR(S) : Guan et al.

It is certified that error appears in the above-identified patent and that said Letters Patent is hereby corrected as shown below:

In the Claims

Claim 5: Column 41, Line 27: "one or more second antenna panels after a second time" should read -- one or more antenna panels after a second time --.

Signed and Sealed this
Twenty-eighth Day of February, 2023

Katherine Kelly Vidal
*Director of the United States Patent and Trademark Office*